(12) United States Patent
Snyder et al.

(10) Patent No.: US 8,661,366 B2
(45) Date of Patent: Feb. 25, 2014

(54) BUILDING MACRO ELEMENTS FOR PRODUCTION AUTOMATION CONTROL

(75) Inventors: Robert J. Snyder, St. Augustine, FL (US); John R. Benson, Jacksonville, FL (US); Kevin K. Morrow, Jacksonville, FL (US); Alex Holtz, Jacksonville, FL (US); William H. Couch, Fernandina Beach, FL (US); Richard Todd, Jacksonville, FL (US); Maurice Smith, Jacksonville, FL (US)

(73) Assignee: Thomson Licensing, Boulogne-Billancourt (FR)

( * ) Notice: Subject to any disclaimer, the term of this patent is extended or adjusted under 35 U.S.C. 154(b) by 636 days.

(21) Appl. No.: 12/455,939

(22) Filed: Jun. 9, 2009

(65) Prior Publication Data

US 2009/0292991 A1 Nov. 26, 2009

Related U.S. Application Data

(60) Division of application No. 10/841,618, filed on May 10, 2004, now Pat. No. 7,549,128, and a continuation-in-part of application No. 10/208,810, filed on Aug. 1, 2002, and a continuation-in-part of application No. 09/836,239, filed on Apr. 18, 2001, now Pat. No. 6,760,916, and a continuation-in-part of application No. 09/634,735, filed on Aug. 8, 2000, now Pat. No. 7,024,677, which is a continuation-in-part of application No. 09/488,578, filed on Jan. 21, 2000, now Pat. No. 8,560,951, which is a continuation-in-part of application No. 09/482,683, filed on Jan. 14, 2000, now Pat. No. 6,952,221, which is a continuation-in-part of application No. 09/215,161, filed on Dec. 18, 1998, now Pat. No.

(Continued)

(51) Int. Cl.
*G06F 3/00* (2006.01)

(52) U.S. Cl.
USPC ............ 715/792; 715/794; 715/720; 715/810

(58) Field of Classification Search
USPC .................................. 715/723, 864, 720, 716
See application file for complete search history.

(56) References Cited

U.S. PATENT DOCUMENTS

| 5,115,310 A | 5/1992 | Takano et al. |
| 5,307,456 A | 4/1994 | MacKay |

(Continued)

FOREIGN PATENT DOCUMENTS

| EP | 1262063 | 12/2002 |
| JP | 265677 | 10/1989 |

(Continued)

*Primary Examiner* — Michael Roswell
(74) *Attorney, Agent, or Firm* — Robert D. Shedd; Robert B. Levy

(57) ABSTRACT

A macro element template is replicated to build a macro element library. A macro element is associated with executable instructions for controlling a plurality of production devices to produce a special effect or segment of a media production. One or more automation control objects are positioned onto a control interface to build a macro element template. Build information is associated with each automation control object to assign a variable name, device type, property page field(s), and variable naming table. A replicator control interface allows a range of sources to be assigned to the macro element template, and is associated with executable instructions for building the macro element library. The macro element library includes user-defined filenames that enables a director to quickly search and select a desired macro element. Changes in production values ripple throughout the macro element library to dynamically update the macro elements.

4 Claims, 9 Drawing Sheets

Related U.S. Application Data 6,452,612, application No. 12/455,939, which is a continuation-in-part of application No. 09/822,855, filed on Apr. 2, 2001, now abandoned, and a continuation-in-part of application No. 09/832,923, filed on Apr. 12, 2001, now Pat. No. 6,909,874, and a continuation-in-part of application No. 10/247,783, filed on Sep. 20, 2002, and a continuation-in-part of application No. 10/431,576, filed on May 8, 2003, now abandoned, and a continuation-in-part of application No. 10/434,458, filed on May 9, 2003, now Pat. No. 7,835,920, and a continuation-in-part of application No. 10/434,461, filed on May 9, 2003, application No. 12/455,939, which is a continuation-in-part of application No. 10/434,460, filed on May 9, 2003, now abandoned.

(60) Provisional application No. 60/468,972, filed on May 9, 2003, provisional application No. 60/386,753, filed on Jun. 10, 2002, provisional application No. 60/309,788, filed on Aug. 6, 2001, provisional application No. 60/193,452, filed on Mar. 31, 2000, provisional application No. 60/196,471, filed on Apr. 12, 2000, provisional application No. 60/363,098, filed on Mar. 12, 2002, provisional application No. 60/323,328, filed on Sep. 20, 2001, provisional application No. 60/378,655, filed on May 9, 2002, provisional application No. 60/378,656, filed on May 9, 2002, provisional application No. 60/378,657, filed on May 9, 2002, provisional application No. 60/378,672, filed on May 9, 2002, provisional application No. 60/378,671, filed on May 9, 2002.

(56) References Cited

U.S. PATENT DOCUMENTS

| | | | | |
|---|---|---|---|---|
| 5,388,197 | A | * | 2/1995 | Rayner .......................... 715/723 |
| 5,537,157 | A | * | 7/1996 | Washino et al. ............... 348/722 |
| 5,641,596 | A | | 6/1997 | Gray et al. |
| 5,795,228 | A | * | 8/1998 | Trumbull et al. ............... 463/42 |
| 5,930,446 | A | * | 7/1999 | Kanda .......................... 386/282 |
| 6,141,007 | A | * | 10/2000 | Lebling et al. ................. 715/792 |
| 6,144,375 | A | | 11/2000 | Jain et al. |
| 6,404,978 | B1 | | 6/2002 | Abe |
| 6,452,612 | B1 | | 9/2002 | Holtz et al. |
| 6,460,018 | B1 | | 10/2002 | Kasai et al. |
| 7,024,677 | B1 | | 4/2006 | Snyder et al. |
| 7,181,523 | B2 | | 2/2007 | Sim |
| 7,549,128 | B2 | | 6/2009 | Snyder et al. |
| 2001/0038392 | A1 | * | 11/2001 | Humpleman et al. ........ 345/733 |
| 2002/0017164 | A1 | | 2/2002 | Fogg |
| 2002/0005307 | A1 | | 5/2002 | Holtz et al. |
| 2002/0005424 | A1 | | 5/2002 | Holtz et al. |
| 2002/0011380 | A1 | | 8/2002 | Samra et al. |
| 2002/0109710 | A1 | | 8/2002 | Holtz et al. |
| 2003/0026662 | A1 | | 11/2003 | Avinash et al. |
| 2008/0028340 | A1 | * | 1/2008 | Davis ............................ 715/853 |

FOREIGN PATENT DOCUMENTS

| | | |
|---|---|---|
| JP | 276160 | 10/1998 |
| JP | 11-266422 | 9/1999 |
| WO | WO9722204 | 6/1997 |
| WO | WO01/52526 | 7/2001 |
| WO | WO02087244 | 10/2002 |
| WO | WO2004/095829 | 11/2004 |

\* cited by examiner

Video to Audio Link Table

| # | Video Source | Linked Audio Source |
|---|---|---|
| 1 | CAM1 | MIC1 |
| 2 | CAM2 | MIC2 |
| 3 | CAM3 | |
| 4 | CAM4 | |
| 5 | VTR1 | VTR1 |
| 6 | VTR2 | VTR2 |
| 7 | VTR3 | |

VARIABLES          DELETE (V) VTR
(A) MICS

130 — ADD Property     DELETE Property — 131

Video Naming Table
Link DVE1 Icon1 to Machine Icon1
Link DVE1 Icon1 to Machine Icon2
Link DVE1 Icon1 to Audio Icon2 Cross-fade(A to B)
Link DVE1 Icon1 to Audio Icon3

FIG. 5

BUILDING MACRO ELEMENTS FOR PRODUCTION AUTOMATION CONTROL

CROSS-REFERENCE TO RELATED APPLICATIONS

This application is a divisional of U.S. application Ser. No. 10/841,618, filed May 10, 2004 now U.S. Pat. No. 7,549,128, herein incorporated by reference.

This application claims the benefit of U.S. Provisional Application No. 60/468,972, filed May 9, 2003, by Snyder et al., entitled "Building Macro Elements for Production Automation Control," incorporated herein by reference in its entirety.

This application is a continuation-in-part of U.S. application Ser. No. 10/208,810, filed Aug. 1, 2002, by Holtz et al., entitled "Method, System, and Computer Program Product for Producing and Distributing Enhanced Media," incorporated herein by reference in its entirety; which claims the benefit of U.S. Provisional Application No. 60/386,753, filed Jun. 10, 2002, by Holtz et al., entitled "Method, System and Computer Program Product for Producing and Distributing Enhanced Media," incorporated herein by reference in its entirety; as well as the benefit of U.S. Provisional Application No. 60/309,788, filed Aug. 6, 2001, by Holtz, entitled "Webcasting and Business Models," incorporated herein by reference in its entirety.

This application is a continuation-in-part of U.S. application Ser. No. 09/836,239, filed Apr. 18, 2001 now U.S. Pat. No. 6,760,916, by Holtz et al., entitled "Method, System and Computer Program Product for Producing and Distributing Enhanced Media Downstreams," incorporated herein by reference in its entirety.

This application is a continuation-in-part of U.S. application Ser. No. 09/634,735, filed Aug. 8, 2000 now U.S. Pat. No. 7,024,677, by Snyder et al., entitled "System and Method for Real Time Video Production and Multicasting," incorporated herein by reference in its entirety; which is a continuation-in-part of U.S. application Ser. No. 09/488,578, filed Jan. 21, 2000, by Snyder et al., entitled "System and Method for Real Time Video Production and Multicasting," incorporated herein by reference in its entirety; which is a continuation-in-part of U.S. application Ser. No. 09/482,683, filed Jan. 14, 2000 U.S. Pat. No. 6,952,221, by Holtz et al., entitled "System and Method for Real Time Video Production and Multicasting," incorporated herein by reference in its entirety; which is a continuation-in-part of U.S. application Ser. No. 09/215,161, filed Dec. 18, 1998 (now U.S. Pat. No. 6,452,612), by Holtz et al., incorporated by reference in its entirety.

This application is a continuation-in-part of U.S. application Ser. No. 09/822,855, filed Apr. 2, 2001 now abandoned, by Holtz et al., entitled "Method, System and Computer Program Product for Full News Integration and Automation in a Real Time Video Production Environment," incorporated herein by reference in its entirety; which claims the benefit of U.S. Provisional Application No. 60/193,452, filed Mar. 31, 2000, by Holtz et al., entitled "Full News Integration and Automation for a Real time Video Production System and Method," incorporated herein by reference in its entirety.

This application is a continuation-in-part of U.S. application Ser. No. 09/832,923, filed Apr. 12, 2001 now U.S. Pat. No. 6,909,874, by Holtz et al., entitled "Interactive Tutorial Method, System and Computer Program Product for Real Time Media Production," incorporated herein by reference in its entirety; which claims the benefit of U.S. Provisional Application No. 60/196,471, filed Apr. 12, 2000, by Holtz et al., entitled "Interactive Tutorial System, Method and Computer Program Product for Real Time Video Production," incorporated herein by reference in its entirety.

This application is a continuation-in-part of U.S. application Ser. No. 10/247,783, filed Sep. 20, 2002, by Holtz et al., entitled "Advertisement Management Method, System, and Computer Program Product," incorporated herein by reference in its entirety; which claims the benefit of U.S. Provisional Application No. 60/363,098, by Holtz, filed Mar. 12, 2002, entitled "Sales Module to Support System for On-Demand Internet Deliver of News Content," incorporated herein by reference in its entirety; as well as the benefit of U.S. Provisional Application No. 60/323,328, by Holtz, filed Sep. 20, 2001, entitled "Advertisement Management Method, System, and Computer Program Product," incorporated herein by reference in its entirety.

This application is a continuation-in-part of U.S. application Ser. No. 10/431,576, filed May 8, 2003, by Snyder et al., entitled "Time Sheet for Real Time Video Production System and Method," incorporated herein by reference in its entirety; which claims the benefit of U.S. Provisional Application No. 60/378,655, filed May 9, 2002, by Holtz et al., entitled "Enhanced Timeline," incorporated herein by reference in its entirety.

This application is a continuation-in-part of U.S. application Ser. No. 10/434,458, filed May 9, 2003 now U.S. Pat. No. 7,835,920, by Snyder et al., entitled "Director Interface for Production Automation Control," incorporated herein by reference in its entirety; which claims the benefit of U.S. Provisional Application No. 60/378,656, filed May 9, 2002, by Holtz et al., entitled "Director's Interface," incorporated herein by reference in its entirety.

This application is a continuation-in-part of U.S. application Ser. No. 10/434,461, filed May 9, 2003, by Holtz et al., entitled "Systems, Methods, and Computer Program Products for Automated Real-Time Execution of Live Inserts of Repurposed Stored Content Distribution, and Multiple Aspect Ratio Automated Simulcast Production," incorporated herein by reference in its entirety; which claims the benefit of U.S. Provisional Application No. 60/378,657, filed May 9, 2002, by Holtz, entitled "Automated Real-Time Execution of Live Inserts of Repurposed Stored Content Distribution," incorporated herein by reference in its entirety; as well as the benefit of U.S. Provisional Application No. 60/378,672, filed May 9, 2002, by Holtz, entitled "Multiple Aspect Ratio Automated Simulcast Production," incorporated herein by reference in its entirety.

This application is a continuation-in-part of U.S. application Ser. No. 10/434,460, filed May 9, 2003 now abandoned, by Snyder et al., entitled "Autokeying Method, System, and Computer Program Product," incorporated herein by reference in its entirety; which claims the benefit of U.S. Provisional Application No. 60/378,671, filed May 9, 2002, by Snyder et al. entitled "Automated Keying Method, System, and Computer Program Product," incorporated herein by reference in its entirety.

The following United States and PCT utility patent applications have a common assignee and contain some common disclosure:

"System and Method For Real Time Video Production and Multicasting," PCT Patent Application No. PCT/U.S. 01/00547, by Snyder et al., filed Jan. 9, 2001, incorporated herein by reference in its entirety;

"Method, System and Computer Program Product for Full News Integration and Automation in a Real Time Video Production Environment," PCT Patent Application No. PCT/U.S. 01/10306, by Holtz et al., filed Apr. 2, 2001, incorporated herein by reference in its entirety;

"Real Time Video Production System and Method," U.S. application Ser. No. 10/121,608, filed Apr. 15, 2002, by Holtz et al., incorporated herein by reference in its entirety;

"Method, System and Computer Program Product for Producing and Distributing Enhanced Media Downstreams," PCT Patent Application No. PCT/U.S. 02/12048, by Holtz et al., filed Apr. 17, 2002, incorporated herein by reference in its entirety;

"Playlist for Real Time Video Production," U.S. application Ser. No. 10/191,467, filed Jul. 10, 2002, by Holtz et al., incorporated herein by reference in its entirety;

"Real Time Video Production System and Method," U.S. application Ser. No. 10/200,776, filed Jul. 24, 2002, by Holtz et al., incorporated herein by reference in its entirety;

"Method, System and Computer Program Product for Producing and Distributing Enhanced Media," PCT Patent Application No. PCT/U.S. 02/24929, by Holtz et al., filed Aug. 6, 2002, incorporated herein by reference in its entirety;

"Advertisement Management Method, System, and Computer Program Product," PCT Patent Application No. PCT/U.S. 02/29647, filed Sep. 20, 2002, by Holtz et al., incorporated herein by reference in its entirety; and "Video Production System for Automating the Execution of a Video Show," PCT Patent Application No. PCT/U.S. 03/14427, filed May 9, 2003, by Holtz et al., incorporated herein by reference in its entirety.

BACKGROUND OF THE INVENTION

1. Field of the Invention

The present invention relates generally to media production, and more specifically, to automating production devices during a media production.

2. Related Art

Conventionally, the production of a live or live-to-tape video show (such as a network news broadcast, talk show, or the like) is largely a manual process involving a team of specialized individuals working together in a video production environment having a studio and a control room. The video production environment is comprised of many diverse types of video production devices, such as video cameras, microphones, video tape recorders (VTRs), video switching devices, audio mixers, digital video effects devices, teleprompters, and video graphic overlay devices, etc.

In a conventional production environment, the video production devices are manually operated by a production crew (which does not include the performers and actors, also known as the "talent") of artistic and technical personnel working together under the direction of a director. A standard production crew is made up of nine or more individuals, including camera operators (usually one for each camera, where there are usually three cameras), a video engineer who controls the camera control units (CCUs) for each camera, a teleprompter operator, a character generator operator, a lighting director who controls the studio lights, a technical director who controls the video switcher, an audio technician who controls an audio mixer, tape operator(s) who control(s) a bank of VTRs, and a floor director inside the studio who gives cues to the talent.

Typically, the director coordinates the entire production crew by issuing verbal instructions to them according to a script referred to as a director's rundown sheet. Generally, each member of the production crew is equipped with a headset and a microphone to allow constant communication with each other and the director through an intercom system. The video produced by crew is delivered or transmitted to a master control system that, in turn, broadcasts the video over traditional mediums to a television set. Traditional mediums include the appropriate ranges of the frequency spectrum for television, satellite communications, and cable transmissions. The global Internet and other computer networks present an alternative distribution medium for video productions and like.

During the execution of a live or live-to-tape video show, the production crew must perform multiple parallel tasks using the variety of video production devices. Furthermore, these tasks must all be coordinated and precisely synchronized according to very strict timing requirements. Coordination between the production crew, the director and the talent is vitally important for the successful execution of a show. Accordingly, the logistics of executing a show are extremely difficult to plan and realize.

In the early days, producer rundowns were created manually on paper as a form of putting together the show. New technology allows for this process to be used in networked computers. Companies such as iNEWS™ (i.e., the iNEWS™ news service available on the iNews.com website), Newsmaker, Comprompter, and the Associated Press (AP) have developed news automation systems to manage the workflow processes associated with a newsroom operation. A news automation systems is a network-based service that aggregates stories from news services, such as AP, Konas, and CNN services, in addition to local police and fire station monitoring as well as field reporters from the broadcast station. During a news automation process, all components of a news production (including wire services, assignment editor, reporters, editors, producers, and directors) are connected so that the show building process can be streamlined with file sharing, indexing and archiving by show names. However, if a news automation source changes or becomes unavailable, the director must be able to quickly adjust the rundown to avoid errors on the air.

Thus, a significant problem with today's conventional production environment is the director must be able to quickly assign sources while executing the show. During a live production, production equipment may fail to operate or members of the crew or talent may miss their cues. The director must be able to quickly react to these dynamic events.

The above problems can be overcome with the aid of production automation systems, such as the automated production control system described in U.S. Pat. No. 6,452,612, issued Sep. 17, 2002, to Holtz et al., which is incorporated herein by reference in its entirety. However, even in a fully automated production control environment, it is conceivable that equipment may fail and require immediate replacement during a live broadcast. The content and order of news stories may change (e.g., breaking news) and require new sources to be made available. Pre-recorded or re-purposed content may need to be re-composited to remove inappropriate layers, such as a "live" key on a previous broadcast, objectionable images, etc. In other words, the director must be able to quickly change the production values or equipment without causing noticeable errors during a live broadcast.

Therefore, a need exists to develop a technology that addresses these concerns.

SUMMARY OF THE INVENTION

A method, system, and computer program product are provided to overcome the above problems by making available a library of macro elements for an automation control system, such as the production environment is described in the pending U.S. application entitled "System and Method for Real Time Video Production and Multicasting" (U.S. application Ser. No. 09/634,735), which is incorporated herein by reference in its entirety. The macro elements are sourced or assigned predefined production values, so that the director can quickly select the correct macro element to implement special effects or produce segments of a media production. Furthermore, changes in the production values ripple throughout the macro element library, so the director does not have to manually change each affected macro element.

The present invention enables a template for a macro element to be replicated to build a library of macro elements. The library of macro elements contains user-defined names, such that a director can quickly search and select a macro element to produce a segment of a media production.

In an embodiment, a control interface is provided to build a macro element template. As an automation control object is positioned onto the control interface, build information is associated with the automation control object to support the replication process. The build information includes a variable name and several variable properties. The variable properties include the operation rules for replicating a macro element template. The variable properties comprise a device type, property page field(s), and a variable naming table for each assigned variable. The device type is the type of media production device that is controlled by the automation control object. The property page includes one or more fields that specify various properties used to range the variable. The variable naming table contains a name for each available source that is selected for ranging.

After a macro element template has been created, the template is opened in a replicator control interface, which replicates the various ranges set for each variable. The replicator control interface is associated with executable instructions for building a collection of macro elements from the ranges of sources specified in a macro element template. The collection of macro elements contains all eligible combinations of sources for all variables.

In an embodiment, each macro element is built and archived in a user-specified storage location, and an association file is created or updated with a filename and path information for the new macro element file. In conjunction, an association name is assigned to the macro element. Association names are used to integrate an automation control system with news automation systems and a director's rundown sheet, as described in the pending U.S. application entitled "Method, System and Computer Program Product for Full News Integration and Automation in a Real Time Video Production Environment" (U.S. application Ser. No. 09/822,855), which is incorporated herein by reference in its entirety.

In an embodiment, a universal naming convention provides a standard format for creating a filename, association name, and path to each macro element file built during replication. In an embodiment, the syntax "//server/share/path/filename" is used for the path. The filename is based on the template filename and the variable names from the naming tables. Thus, macro element list provides a library of macro elements in a user-defined naming scheme for easy selection.

As each macro element file is built during replication, the naming tables, linking information, and other build information are included with the macro element file. For example, the naming tables support the naming convention for automatically creating macro element filenames. The linking information allows the variables to be linked, such that future changes made to a particular source or other production values are automatically reflected in all macro element files containing related fields.

Once a macro element has been built according to the present invention, the macro element can be tested to ensure that the macro element operates properly with each source. In an embodiment, a standalone application is provided to build macro elements from a macro element template. Afterwards, the macro elements are imported into a separate automation control program that executes each macro element file to test the sources and/or produce a media production.

In another embodiment, a macro element is built on an automation control program and subsequently imported into a separate control interface to build a macro element template. A collection of macro elements is built from the macro element templates, and then, each macro element is imported into the automation control program for testing and automation control.

In another embodiment, the above-mentioned control interface and replication control interface are integrated into an automaton control program to allow the creation of macro element templates, which are replicated to produce a collection of macro elements for each template. Each macro element can be tested and executed to produce a media production without having to import the macro element into another application program.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable one skilled in the pertinent art(s) to make and use the invention. In the drawings, generally, like reference numbers indicate identical or functionally or structurally similar elements. Additionally, generally, the leftmost digit(s) of a reference number identifies the drawing in which the reference number first appears.

FIG. 4 illustrates a video-to-audio table according to an embodiment of the present invention.

FIG. 5 illustrates a user interface for creating a variable name list and a variable property list according to an embodiment of the present invention.

DETAILED DESCRIPTION OF THE INVENTION

Figure 1:
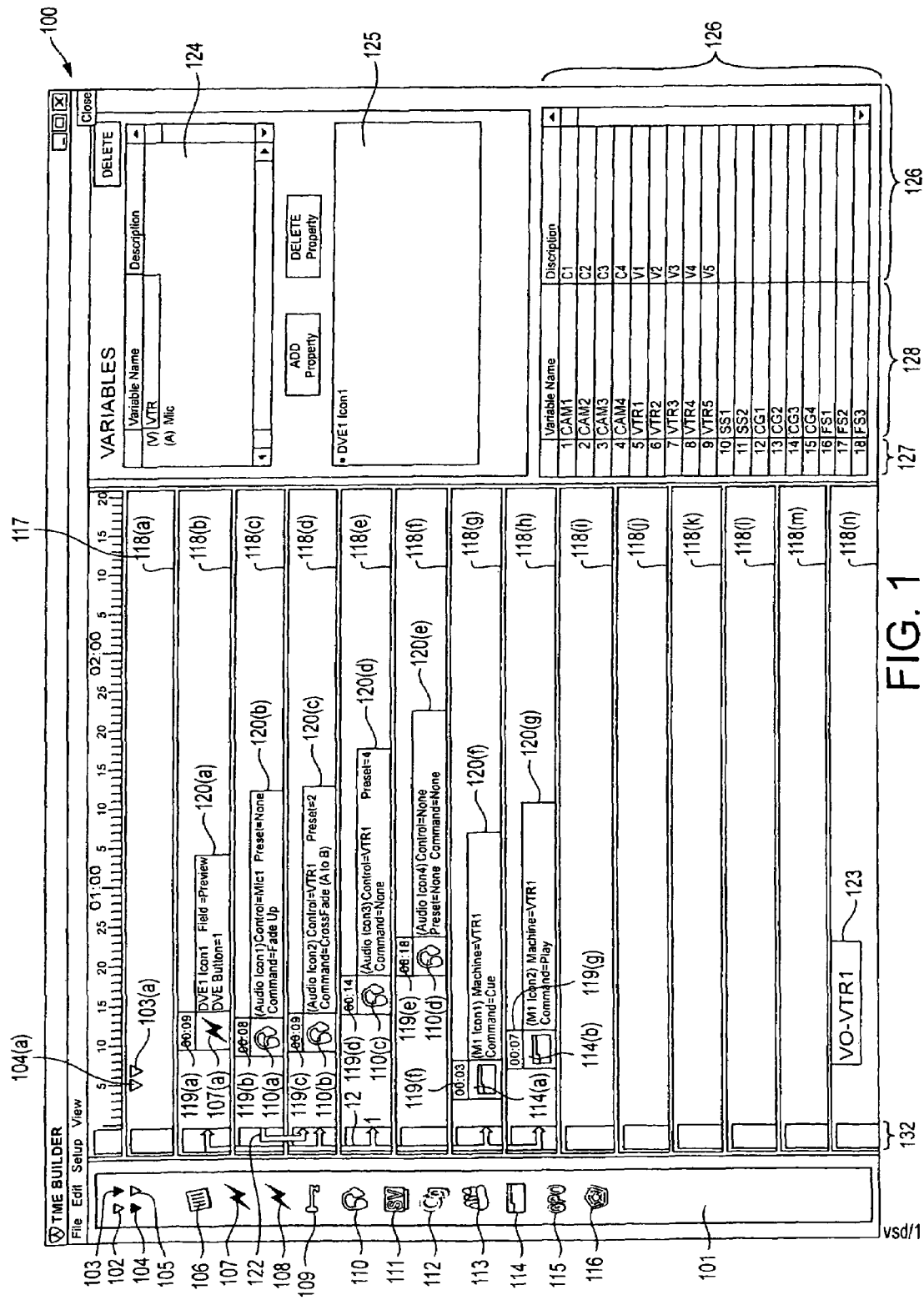
FIG. 1 illustrates a control interface for building a macro element according to an embodiment of the present invention.

The present invention enables a template for a macro element to be replicated to build a plurality of different macro elements. A director can recall each macro element by filename to produce a segment of a media production.

A director's rundown sheet comprises multiple elements for producing a show. An element, therefore, comprises a group of commands for instructing a production crew to operate the production equipment and thereby, produce a segment or special effects for a show. An example is a voice-over (VO) element. In this case, several commands are required to execute a VO element or line item on the director's rundown. Specifically, commands are required for a video switcher, audio mixer, teleprompter, and a record/playback device (RPD), such as a videotape recorder/player (VTR) or video server. These commands are "grouped" together to define the VO element.

In an automated production environment, an element represents a group of commands for automating the control of production equipment without significant human interactions. An example of an automated production environment is described in the pending U.S. application entitled "System and Method for Real Time Video Production and Multicasting" (U.S. application Ser. No. 09/634,735), which is incorporated herein by reference in its entirety. As described in U.S. application Ser. No. 09/634,735, an automated production can be managed and controlled by an automation control program, such as the Transition Macro™ multimedia production control program developed by ParkerVision, Inc. (Jacksonville, Fla.). Hence, an automation control program includes several groupings of commands, representing a macro element or group of macro elements.

Accordingly, the director would create a macro element, comprising all the production commands necessary to represent an element on the show rundown. The macro element is executable to control the designated production devices, and thereby, produce a show segment or special effect, such as an introduction, package and tag segment (INTRO/PKG/TAG), a voice over segment (VO), a sound-on-tape segment (SOT), an over-the-shoulder segment (OTS), a VO/SOT combination, an on camera segment (ON-CAM), or other types of elements or segments of a show.

As used herein, the term "media production" includes the production of any and all forms of media or multimedia in accordance with the method, system, and computer program product of the present invention. A media production includes, but is not limited to, video of news programs, television programming (such as, documentaries, situation comedies, dramas, variety shows, interviews, or the like), sporting events, concerts, infomercials, movies, video rentals, or any other content. For example, a media production can include streaming video related to corporate communications and training, educational distance learning, or home shopping video-based "e" or "t" -commerce. Media productions also include live or recorded audio (including radio broadcast), graphics, animation, computer generated, text, and other forms of media and multimedia.

Accordingly, a media production can be live, as-live, or live-to-tape. In a "live broadcast" embodiment of the present invention, a media production is recorded and immediately broadcast over traditional airwaves or other mediums (e.g., cable, satellite, etc.) to a television or the like. At the same time (or substantially the same time), the media production can be encoded for distribution over a computer network. In an embodiment, the computer network includes the Internet, and the media production is formatted in hypertext markup language (HTML), or the like, for distribution over the World Wide Web. However, the present invention is not limited to the Internet. A system and method for synchronizing and transmitting traditional and network distributions are described in the pending U.S. application entitled "Method, System, and Computer Program Product for Producing and Distributing Enhanced Media" (U.S. application Ser. No. 10/208,810), which is incorporated herein by reference in its entirety.

The term "as-live" refers to a live media production that has been recorded for a delayed broadcast over traditional or network mediums. The delay period is typically a matter of seconds and is based on a number of factors. For example, a live broadcast may be delayed to grant an editor sufficient time to approve the content or edit the content to remove objectionable subject matter.

The term "live-to-tape" refers to a live media production that has been stored to any type of record playback device (RPD), including a video tape recorder/player (VTR), video recorder/server, virtual recorder (VR), digital audio tape (DAT) recorder, or any mechanism that stores, records, generates, or plays back via magnetic, optical, electronic, or any other storage media. It should be understood that "live-to-tape" represents only one embodiment of the present invention. The present invention is equally applicable to any other type of production that uses or does not use live talent (such as cartoons, computer-generated characters, animation, etc.). Accordingly, reference herein to "live," "as-live," or "live-to-tape" is made for illustration purposes, and is not limiting. Additionally, traditional or network distributions can be live or repurposed from previously stored media productions.

As discussed, the present invention enables a library of macro elements to be created and selected by a director. FIG. 1 illustrates a control interface 100 for building a macro element, according to an embodiment of the present invention. A macro element comprises a group of predetermined functions or routines for defining an element of a director's rundown or controlling a plurality of media production devices to produce a story or segment of a media production. When executed, the macro element enables serial and parallel processing of media production commands that automate the control of one or more production devices, thereby producing the story or segment.

In an embodiment, a macro element is imported, or integrated, into an automation control program, such as the Transition Macro™ multimedia production control program developed by ParkerVision, Inc. (Jacksonville, Fla.) that can be executed to control an automated multimedia production system. The Transition Macro™ program is described in the pending U.S. application entitled "System and Method for Real Time Video Production and Multicasting" (U.S. application Ser. No. 09/634,735), which is incorporated herein by reference in its entirety. As described in the aforesaid U.S. application, the Transition Macro™ program is an event-driven application that allows serial and parallel processing of media production commands. The pending U.S. application entitled "Method, System and Computer Program Product for Producing and Distributing Enhanced Media Downstreams" (U.S. application Ser. No. 09/836,239) also describes representative embodiments of a multimedia production environment that is implementable with the present invention, and is incorporated herein by reference in its entirety. As described in the aforesaid U.S. applications, an automated multimedia production environment includes a centralized media production processing device that automatically or semi-automatically commands and controls the operation of a variety of media production devices in analog and/or digital video environments.

The term "media production device" includes video switcher, digital video effects device (DVE), audio mixer, teleprompting system, video cameras and robotics (for pan, tilt, zoom, focus, and iris control), record/playback device (RPD), character generator, still store, studio lighting devices, news automation devices, master control/media management automation systems, commercial insertion devices, compression/decompression devices (codec), virtual sets, or the like. The term "RPD" includes VTRs, video recorders/servers, virtual recorder (VR), digital audio tape (DAT) recorder, or any mechanism that stores, records, generates or plays back via magnetic, optical, electronic, or any other storage media. In an embodiment, the media production processing device receives and routes live feeds (such as, field news reports, news services, sporting events, or the like) from any type of communications source, including satellite, terrestrial (e.g., fiber optic, copper, UTP, STP, coaxial, hybrid fiber-coaxial (HFC), or the like), radio, microwave, free-space optics, or any other form or method of transmission, in lieu of, or in addition to, producing a live show within a studio.

Referring back to FIG. 1, control interface 100 includes a horizontal timeline 117 and one or more horizontal control lines 118(a)-118(n). A group of automation control objects 101 are available to be positioned onto control lines 118(a)-118(n) at various locations relative to timeline 117. Each automation control object 101 is a graphical depiction (such as, an icon or the like) of a sequence of instructions that, when executed, send one or more media production commands to a production device. When an automation control object 101 is placed on a control line 118(a)-118(n), the placed control object 101 assumes a coordinate property value that matches the corresponding spatial coordinate on timeline 117. The spatial coordinates of timeline 117 are demarcated in frames. However, in another embodiment, the spatial coordinates are demarcated in seconds or some other unit of measurement.

Automation control objects 101 include a user mark 102, a general purpose input/output (GPI/O) mark 103, a step mark 104, and an encode mark 105. User mark 102 is discussed in greater details below. GPI/O mark 103 and step mark 104 are associated with commands that pause or stop further execution of a macro element. In an embodiment, GPI/O mark 103 and step mark 104 are associated with rundown step commands. The rundown step commands instruct a timer indicator (not shown) on timeline 117 to start or stop running until deactivated or reactivated, respectively, by a director or another media production device. For example, step mark 104 and GPI/O mark 103 can be placed onto control line 118(a) to specify a time when a timer indicator (not shown) would automatically stop running. In other words, the timer indicator would stop moving across timeline 117 without the director having to manually stop the process, or without another device (e.g., a teleprompting system (not shown)) having to transmit a timer stop command. If a step mark 104 is activated to stop the timer indicator, the timer indicator can be restarted either manually by the director or automatically by another external device transmitting a step command. If a GPI/O mark 103 is used to stop the timer indicator, the timer indicator can be restarted by a GPI or GPO device transmitting a GPI/O signal.

In an embodiment, step mark 104 and GPI/O mark 103 are used to place a logical break to designate the beginning or end of an element. In other words, step mark 104 and GPI/O mark 103 are placed onto control line 118(a) to designate segments within a media production. One or more configuration files can also be associated with a step mark 103 and GPI/O mark 104 to link metadata with the designated segment.

Encode mark 105 can also be placed on control line 118(a). In an embodiment, encode mark 105 is generated by the Web Mark™ software application developed by ParkerVision, Inc. Encode mark 105 identifies a distinct segment within a media production. As the timer indicator advances beyond encode mark 105, commands associated with encode mark 105 instructs an encoding system to index the beginning of a new segment. The encoding system automatically clips the media production into separate files based on the placement of encode mark 105. This facilitates the indexing, cataloging and future recall of segments identified by encode mark 105. Encode mark 105 allows the director to designate a name for the segment, and specify a segment type classification. Segment type classification includes a major and minor classification. For example, a major classification or topic can be sports, weather, headline news, traffic, health watch, elections, or the like. An exemplary minor classification or category can be local sports, college basketball, NFL football, high school baseball, local weather, national weather, local politics, local community issues, local crime, editorials, national news, or the like. Classifications can expand beyond two levels to an unlimited number of levels for additional granularity and resolution for segment type identification and advertisement targeting. In short, the properties associated with each encode mark 105 provide a set of metadata that can be linked to a specific segment. These properties can be subsequently searched to identify or retrieve the segment from an archive.

Another automation control object 101 is a label object 106, which permits a director to name the element, or one or more portions of the element, built by control interface 100. In an embodiment, the director would drag and drop a label object 106 onto any of control lines 118(a)-118(n), and double click on the positioned label object 106 to open a dialogue box to enter a text description. The text description would be displayed on the control line 118(a)-118(n) as a label 123. FIG. 1 shows a label object 106 has been placed on control line 118(n) to display label 123, which names the current element as a "VO-VTR1".

Transition objects 107-108 are associated with automation control commands for controlling a video switching device. Thus, transition objects 107-108 can be positioned onto any of control lines 118(a)-118(n) to control one or more devices to implement a variety of transition effects or special effects into a media production. Such transition effects include, but are not limited to, fades, wipes, DVE, downstream keyer (DSK) effects, or the like. DVE includes, but are not limited to, warps, dual-box effects, page turns, slab effects, and sequences. DSK effects include DVE and DSK linear, chroma and luma keyers.

FIG. 1 shows two transition objects 107-108, which can be used to send output to two separate mixed effects banks. Each mixed effects bank can be used for different video streams, composite views, camera feeds, or the like. Additional transition objects 107-108 can be added as desired by the system developer.

Alternatively, transition objects 107-108 can be used to command two distinct video switching devices. In an embodiment, a transition object 107 enables control commands to be sent to a manual keyer, which requires a user or director to manually select the keyer. Conversely, a transition object 108 enables control commands to be sent to an automated keyer, which is automatically selected for serial and/or parallel keying. An example of an automated keying system is described in the "pending" U.S. application entitled "Autokeying Method, System, and Computer Program Product" (U.S. application Ser. No. 10/434,460); which is incorporated herein by reference in its entirety.

In another embodiment, transition objects 107-108 represent two automated keyers. In another embodiment, transition objects 107-108 represent two manual keyers. A greater or smaller quantity of manual or automated keyers, separately or in combination, can be associated with control interface 100, and the quantity of transition objects 107-108 can likewise be adjusted for control interface 100, as desired by the system developer.

Another automation control object 101 is a keyer control object 109.

Keyer control object 109 is positioned onto any of control lines 118(a)-118(n) that is configured or assigned to keyer control, and used to prepare and execute one or more keyer layers either in linear, luma, chroma, or a mix thereof for preview or program output. The keyers can be upstream or downstream of the DVE.

An audio object 110 can be positioned onto any of control lines 118(a)-118(n) that is configured or assigned to audio control and is associated with commands for controlling audio equipment, such as audio mixers, digital audio tape (DAT), cassette equipment, other audio sources (e.g., CDs and DATs), or the like. A teleprompter object 111 can be positioned onto any of control lines 118(a)-118(n) that is configured or assigned to teleprompting control and is associated with commands for controlling a teleprompting system. A character generator (CG) object 112 can be positioned onto any of control lines 118(a)-118(n) that is configured or assigned to character generator control and is associated with commands for controlling a CG or still store. A camera object 113 can be positioned onto any of control lines 118(a)-118(n) that is configured or assigned to camera control and is associated with commands for controlling the movement and settings of one or more cameras. A VTR object 114 can be positioned onto any of control lines 118(a)-118(n) that is configured or assigned to VTR control and is associated with commands for controlling a RPD that supplies video with or without audio signals. A GPO object 115 can be positioned onto any of control lines 118(a)-118(n) that is configured or assigned to GPI and/or GPO control, and is associated with commands for controlling GPI and/or GPO devices.

An encode object 116 can be placed on any of control lines 118(a)-118(n) that is configured or assigned to encoder control, and is associated with encoding commands. In an embodiment, encode object 116 is produced by the WebSTATION™ software application developed by ParkerVision, Inc. When activated, encode object 116 initializes the encoding system and starts the encoding process. A second encode object 116 can also be positioned to terminate the encoding process. Encode object 116 also enables the director to link context-sensitive or other media (including an advertisement, other video, web site, etc.) with the media production. In comparison with encode mark 105, encode object 116 instructs the encoding system to start and stop the encoding process to identify a distinct show, whereas encode mark 105 instructs the encoding system to designate a portion of the media stream as a distinct segment. The metadata contained in encode object 116 is used to provide a catalog of available shows, and the metadata in encode mark 105 is used to provide a catalog of available show segments.

User mark object 102 is provided to precisely associate or align one or more automation control objects 101 with a particular time value. For example, if a director desires to place teleprompter object 111 onto one of the teleprompter assigned control lines 118(a)-118(n) such that the spatial coordinate associated with teleprompter object 111 is exactly 00:25 frames, the director would first drag and drop user mark object 102 at the 00:25 frames mark. The director would then drag and drop teleprompter object 111 onto the positioned user mark object 102. Teleprompter object 111 is then automatically placed such that the spatial coordinate associated with teleprompter object 111 is 00:25 frames. In short, any object that is dragged and dropped onto the user mark 111 is automatically placed and has a coordinate property value of 00:25 frames. This feature helps to provide multiple objects with the exact same coordinate property value.

As described above, teleprompting object 111 is associated with a teleprompting system (not shown), which includes a processing unit and one or more displays for presenting a teleprompting script (herein referred to as "script") to the talent. In an embodiment, the teleprompting system is the SCRIPT Viewer™, available from ParkerVision, Inc. As described in the pending U.S. application entitled "Method, System and Computer Program Product for Producing and Distributing Enhanced Media Downstreams" (U.S. application Ser. No. 09/836,239), a teleprompting system can be used to create, edit, and run scripts of any length, at multiple speeds, in a variety of colors and fonts.

In an embodiment, the teleprompting system allows a director to use a text editor to insert media production commands into a script (herein referred to as "script commands"). The text editor can be a personal computer or like workstation, or the text editor can be an integrated component of control interface 100. The script commands include a cue command, a delay command, a pause command, a rundown step command, and an enhanced media command. An enhanced media command links and synchronizes auxiliary information with a script or media production. This allows an additional video, HTML or other format graphics, or related topic or extended-play URLs and data to be associated with the media production. The present invention is not limited to the aforementioned script commands. As would be apparent to one skilled in the relevant art(s), commands other than those just listed can be inserted into a script.

As discussed above, control lines 118(a)-118(n) are configurable for assignment. Each control line 118(a)-118(n) is configurable to enable automation control of any type of media production device. In an embodiment, the device type is determined by the automation control object 101 positioned onto the control lines 118(a)-118(n). Referring to FIG. 1, audio objects 110(a)-110(d) are placed on control lines 118(c)-118(f), respectively. Since audio objects 110(a)-110(d) enables a director to define commands to control audio equipment, control lines 118(c)-118(f) are audio control lines having an assigned audio device type. In other words, control lines 118(c)-118(f) are configurable to define control commands for one or more audio devices.

FIG. 1 also shows two control lines having a transition device type.

Transition objects 114(a)-114(b) are positioned onto control lines 118(g)-118(h), and thereby assigns a transition device type to control lines 118(g)-118(h). In short, control interface 110 enables a director to create a macro element having the quantity and types of control lines as required for a specific element. Control interface 110 allows the director to add new equipment and change the production values, without having to re-write the software code for the interface.

Each placed automation control object 101 has two labels: a timeline position label 119 (shown as 119(a)-119(g)) and an object descriptor 120 (shown as 120(a)-120(g)). For example, referring to placed transition object 107(a), a timeline position label 119(a) sits on top of transition object 107(a), and shows the timeline position (i.e., spatial coordinate of timeline 117) in frames. An object descriptor 120(a) is to the right of transition object 107(a), and contains the icon type (i.e., DVE or transition icon) and icon number (i.e., Icon1) for the placed object. Icon number identifies the number of objects of a certain type have been positioned onto a control line 118(a)-118(n). As shown, object descriptor 120 can include other populated fields that define an automation control object 101. For example, object descriptor 120(a) includes an output field (i.e., Preview) and DVE Button number, both of which are described in greater detail below.

As discussed, control interface 100 displays an example of a macro element that has been designated by a "VO-VTR1" label 123. When executed, the macro element provides commands to produce a voice over segment, whereby a host narrates a video recording during a show. A director places the appropriate control objects 101 onto control interface 100 to create the macro element, which can be executed to automate production of the show element.

Figure 2:
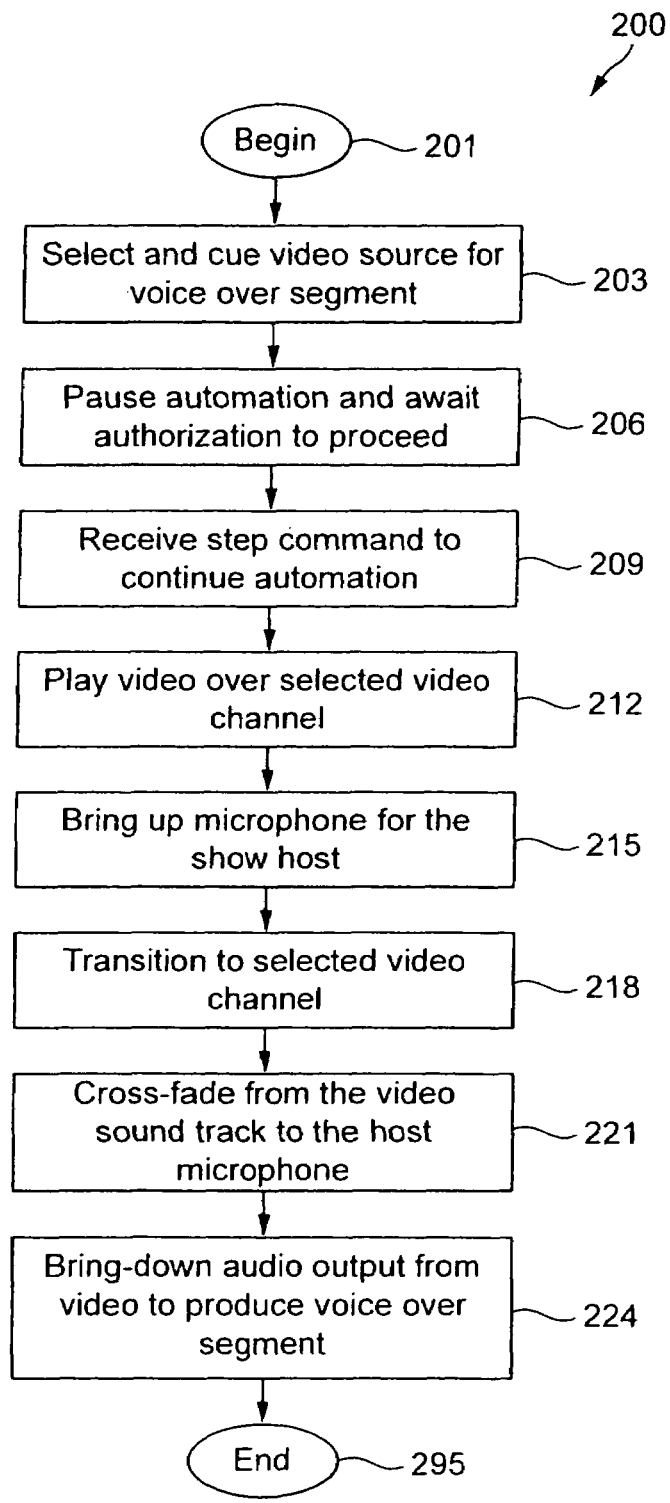
FIG. 2 illustrates an operational flow for building a macro element according to an embodiment of the present invention.

Referring to FIG. 2, flowchart 200 describes an example of a control flow for building the VO-VTR macro element of FIG. 1, according to an embodiment of the present invention. The control flow of flowchart 200 begins at step 201 and passes immediately to step 203. At step 203, a RPD designated as VTR1 is programmed to play a video recording. VTR object 114(a) is positioned onto control line 118(g) to provide a set-up or cue period to ensure that the media production device is set up properly for the production. As illustrated in FIG. 1, the timeline coordinate value associated with VTR object 114(a) is 00:03 frames, and the RPD associated with the cue icon (i.e., VTR object 114(a)) is VTR1. When VTR object 114(a) is activated, a media production processing device sends a cue command to the RPD identified as VTR1. The cue command transmitted to VTR1 includes a timecode or frame code that is associated with VTR object 114(a). Upon receiving the cue command, VTR1 searches for the frame specified by the timecode or frame code in the cue command. In this manner, the video recording is automatically cued by the macro element.

At step 206, step mark 104(a) is positioned to pause further execution of the macro element. In other words, once VTR1 is cued to search for a desired video segment, the macro element stops running until a step command is received to resume operations. At step 209, GPI/O mark 103(a) is positioned to provide a step command to resume the macro element. In this instance, the macro element is restarted by a GPI/O trigger from an external source connected to a GPI port. Alternatively, the macro element can be restarted by a teleprompting system transmitting a step command over a communications interface.

At step 212, VTR object 114(b) is positioned to start playing the video recording cued at step 203. When VTR object 114(b) is activated, the media production processing device transmits a play command to VTR1. Output from VTR1 is linked to a video input channel of a video switching device. At step 215, audio object 110(a) is positioned to bring up the microphone for the host. The microphone is designated as MIC1 and linked to an audio input channel of a video switching device.

At step 218, transition object 107(a) is positioned to designate the video switching device (for steps 212-215) and define a video transition for the production. Possible video transitions include fading, wiping, cutting, or the like. For example, the transition can be a fade from a camera source to video output from VTR1.

For transition object 107(a), video output of VTR1 is selected for preview output. Transition object 107(a) is positioned at the 00:09 frame mark. Thus, when the timer reads 00:09 frames, transition object 107(a) is activated and the media production processing device communicates with a video switcher, or DVE device (designated as DVE1), to produce the desired video transition, which in this case is to couple the video output of VTR1 to a preview output channel. As discussed, VTR object 114(b) is placed on the macro element before transition object 107(a) so that by the time transition object 107(a) is activated, there is a clean video signal coming across the assigned video channel from VTR1.

At step 221, audio object 110(b) is positioned to fade down audio output from VTR1, and simultaneously fade up the host's microphone. When audio object 110(b) is activated, the media production processing device sends an audio mixer control command to an audio mixer. The control command causes the audio mixer to fade down the audio input, which corresponds to the audio output VTR1.

Figure 3:
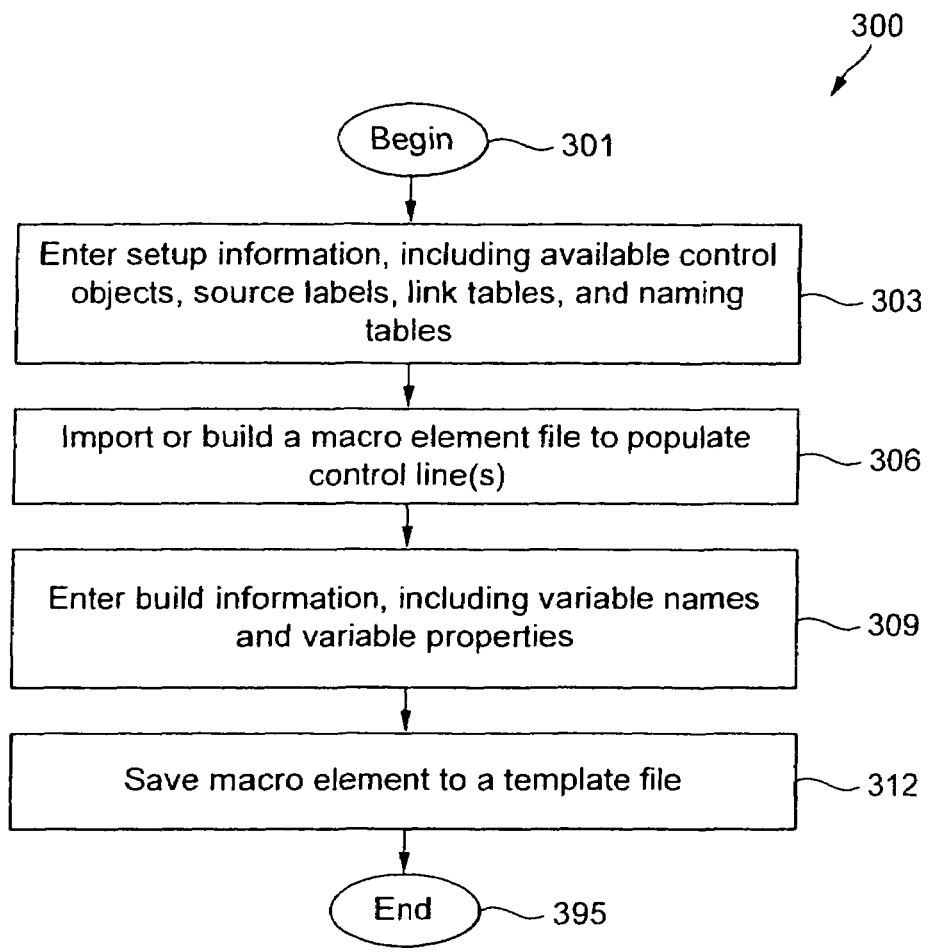
FIG. 3 illustrates an operational flow for creating a macro element template according to an embodiment of the present invention.

At step 224, audio object 110(c) is placed to bring down the audio output from VTR1 to a preset level. Audio object 110(d) is placed to ungroup all audio sources. Afterwards, the control flow ends as indicated at step 295. As an automation control object 101 is positioned onto a control line 118(a)-118(n), a variable and other build information are assigned, so that additional templates can be built from the macro element without having to manually reenter repetitive data. This can be seen with reference to FIG. 3, where flowchart 300 represents the general operational flow of an embodiment of the present invention. More specifically, flowchart 300 shows an example of a control flow for creating a macro element template according to the present invention.

The control flow of flowchart 300 begins at step 301 and passes immediately to step 303. At step 303, a setup file is opened to access the configuration parameters. In an embodiment, the setup file inputs a list of automation control objects 101 for controlling the available media production devices. In an embodiment, the director is able to select from a predefined list of studio systems. Each studio system includes a group of automation control objects 101 that correspond to media production devices that are available for the studio system. A system may include one or more objects, including but not limited to a transition object 107-108, keyer control object 109, automation keyer object, auxiliary keyer object, downstream keyer (DSK) object, or auxiliary video object. One studio system can include two transition control objects 107-108, one keyer control object 109, two automated keyers per DVE device, three auxiliary keyers, two DSK devices, and eight auxiliary video. A second studio system can include two transition control objects 107-108, one keyer control object 109, one automated keyer per DVE device, one auxiliary keyer, one DSK device, and one auxiliary video. A third studio system can include one transition control object 107-108, one keyer control object 109, one automated keyer per DVE device, one auxiliary keyer, one DSK device, and one auxiliary video. One of the systems can be designated as a default system, and the director can have the option of choosing another system.

A second configuration parameter that can be inputted by the setup file is the source labels used to designate I/O ports for each media production device. Source labels enable the director to select inputs by a recognizable name instead of a non-descriptive number. In an embodiment, an application initialization file (herein referred to as "studio.ini") supplies labels for each video input source and machine control port. An application macro file (herein referred to as "studio.mac") supplies labels for each audio input and DVE button labels.

The setup file also input a link table that denotes the linking relationships among various sources. In an embodiment, eight link tables are provided. The tables include a video-to-audio table, video-to-port table, video-to-CG-port table, camera-preset-to-audio table, camera-preset-to-video table, key-fill-to-key-hole table, audio-to-audio table, and video-to-GPO table. The video-to-audio table links one or more audio channels to a video channel. The video-to-port table links a machine control port to a video channel. The video-to-CG-port table links a CG control port to a video channel. The camera-preset-to-audio table links one or more audio channels to a camera preset channel. The camera-preset-to-video table links a camera preset channel to a video channel. The key-fill-to-key-hole table links a key hole to a "fill" video channel. The audio-to-audio table links an audio channel or group of audio channels to one or more audio channels. Finally, the video-to-GPO table links a video channel to a GPO port.

An example of a video-to-audio table 400 is shown in FIG. 4. Column 401 is a numerical list of video sources that can be linked to one or more audio sources. Source column 128 displays user-defined or default source names, discussed below, for each video source. Linking column 403 allows the director to link an audio source to each video source. To link an audio source, the director enters a source name, discussed below, for each audio source that is being linked.

In an embodiment, the setup file inputs macro element naming tables. In an embodiment, five naming tables are provided. A video naming table, audio naming table, DVE button naming table, camera preset naming table, and machine device naming table. The video naming table is used to name each video source. The director can enter a name for each source, or accept the default value, which is the source label from the studio.ini file. An example of a video naming table 126 is shown in FIG. 1. Column 127 is a numerical list of the available video inputs. Source column 128 displays the user-defined or default source names for the video inputs. Variable name column 129 allows the director to enter a variable name for each video input. If no entry is made, the source name for the input is used.

The audio naming table is used to name each audio source. The director can enter a name for each audio source, or accepts the default value. The default value is the source label from a studio.amx file, which is a subfile of the studio.mac file.

The DVE button naming table is used to name each DVE button. The director can enter a name or accept the default value. The default value is the source label from a studio.dvb file, which is a subfile of the studio.mac file.

The camera preset naming table is used to name each camera preset button. The director can enter a name or accept the default value. The default value is the source label (i.e., preset number) from the studio.pre file, which is a subfile of the studio.mac file.

The machine device naming table is used to name each machine control port. The director can enter a name for each machine control port or accept the default value, which is the source label (i.e., port name) from the studio.ini file.

At step 306, a macro element file is imported. The imported file populates the control lines 118(*a*)-118(*n*) of control interface 100 from top to bottom. A director can retrieve a macro element file from a storage medium, or build a new macro element as discussed above with reference to FIG. 2. If a macro element file is imported, the timeline positions and properties of each automation control object 101 must be locked at the time of importation.

At step 309, build information is entered for each automation control object 101. The build information includes a variable name and variable properties. The variable name identifies, or is linked to, the device type that will be ranged during replication, and the variable properties include the device type, a naming table, and property page field(s).

Referring back to FIG. 1, the variable name for an automation control object 101 appears in a variable name list 124, and variable properties associated with the variable name appears in a variable property list 125. Variable property list 125 includes the operation rules for replicating a macro element template. The director defines or selects the variable properties from a list associated with the selected automation control object 101. Add property button 130 can be activated to insert a variable property, and delete property button 131 can be activated to remove a variable property.

As discussed, the variable properties include device type, property page field(s), and variable naming table for each assigned variable. The device type identifies the type of media production device that is being controlled by the automation control object 101. The device type is linked to the variable name. A dialogue box can be opened to access a property page for an assigned variable. As discussed below, the property page includes one or more fields that specify various properties used to range the variable. Each variable is also assigned to a variable naming table that corresponds to the variable name. When a macro element is built during replication, the variable naming table is referenced for the variable name to be used in the macro element file name, which is described in greater details below.

Specifying a variable name and variable properties can be explained with reference back to FIG. 1. As shown, transition object 107(*a*) is given a variable name "VTR," since this object is defined to control transition effects for a VTR source. As a variable name is entered, the variable name is recorded to variable name list 124. The device type for the variable is automatically placed in a variable property list 125, which links a variable name to its variable properties. For transition object 107(*a*), the device type is DVE.

Therefore, the variable property "DVE1 Icon 1" is automatically placed in variable property list 125. A DVE Button naming table is also provided for transition object 107(*a*). If the director uses an input device to select the VTR variable name in variable name list 124, the assigned properties for the variable name are displayed in variable property list 125.

Similarly, audio object 110(*a*) is assigned the variable name "MIC" as shown in variable name list 124. The device type is audio and is automatically placed in variable property list 125.

In addition to device type and variable naming table, values must also be assigned to the property page field(s) associated with each variable.

Generally, the property page field(s) specifies I/O channels and/or control instructions for media production devices associated with each automation control object 101. As such, the property page field(s) depends on the type of automation control object 101 that is being ranged. Moreover, additional properties can be specified to link the operation of one automation control object 101 with another.

Referring back to FIG. 1, nine types of automation control objects 101 are depicted as being eligible for ranging. These automation control objects 101 include transition objects 107-108, keyer control object 109, audio object 110, teleprompter object 111, CG object 112, camera object 113, VTR object 114, GPO object 115, and encode object 116. In another embodiment, additional automation and control objects can be defined for inclusion with, or as a replacement for, those objects depicted in FIG. 1, and are considered to be within the scope of the present invention.

For transition object 107-108, property page fields are completed to specify the output channel for a transitioned video and/or audio source. The output channel can be a preview channel, a program channel, or an auxiliary channel. Other properties can be added as necessary. For instance, information used to link the operation or output controlled by transition object 107-108 with another automation control object 101 can also be entered. In embodiments, linking information provides instructions for linking a video channel with one or more audio channels, a video channel with a machine control port, a video channel with input from a CG device, a camera preset channel with one or more audio channels, a camera preset channel with a video channel, and a key fill channel with input for a key hole.

In an embodiment, linking information is entered in a dialogue box containing property page field(s) or in a link table, such as table 400 described with reference to FIG. 4). In another embodiment, linking information is entered in variable property list 125 with the device type. FIG. 5 illustrates another embodiment of variable name list 124 and variable property list 125, which includes linking information. Variable property list 125 includes several linking properties for variable name VTR. Add property button 130 can be activated to insert additional variable properties, and delete property button 131 can be activated to remove a variable property.

The linking properties are graphically depicted in a linking column 132 in FIG. 1. Referring to FIG. 1 and FIG. 5, link 121 is used to link transition object 107(*a*) to VTR object 114(*a*), which links the control of DVE1 to the cue commands of VTR1. Link 121 also links transition object 107(*a*) to VTR object 114(*b*), which links the control of DVE1 to the play commands of VTR1. Link 121 also links transition object 107(*a*) to audio objects 110(*b*)-110(*c*), which brings down audio from VTR1 to enable audio from another source, i.e., MIC1.

If audio commands are assigned to a variable, an audio object 110 must be selected. For audio, the property page field(s) includes an audio command field, audio control channel field, audio preset field, cross-fade group field, and audio grouping field. The audio command field includes the instructions for controlling an audio device. Audio commands include, but are not limited to, fade up, fade down, cross-fade-up, and cross-fade-down.

If a single channel is assigned to audio object 110, the channel is placed in the audio control channel field. If audio is grouped from a link table, the first channel of the grouped channels is placed in the audio control channel field. The other channels are grouped together. If more than one audio channel is linked with a video channel, the first audio channel is placed in the audio control channel field and the other audio channels are grouped together.

An audio preset can be entered to specify desired audio control levels. The control levels include volume, balance, minimum and maximum levels for fading, and fade time. Other control levels include equalizer settings, auxiliary volume control, channel groups, or the like.

If cross-fading is selected, a master group field displays a master group of channels, and a subordinate group field displays the subordinate group of channels. A first group letter (e.g., group A) is entered in the master group field to cross-fade up all channels grouped under that letter, and a second group letter (e.g., group B) is entered in the subordinate group field to cross-fade down all other channels.

Accordingly, when an audio object 110 having a cross-fade-down command is activated, the media production processing device sends a control command to an audio mixer that causes the audio mixer to fade down all of the audio channels that are a member of group A and to simultaneously fade up all channels that are a member of group B. This can be explained with reference back to FIG. 1. As shown, audio object 110(*a*) is defined to control audio input from MIC1. Audio object 110(*b*) is defined to cross-fade audio input from VTR1. Link 122 links audio object 110(*a*) to audio object 110(*b*). The audio channel to VTR1 is designated as master group A, and the audio channel to MIC1 is designated as subordinate group B. Therefore, when cross-fading object 110(*b*) is activated, a control command is sent to an audio mixer to fade down the channel to VTR1 and simultaneously fade up the channel to MIC 1, thereby providing a voice over (VO) segment.

The audio grouping field is another property page field for audio object 110. As such, variable properties can be set to sum two or more variables. Audio channels of different variables are all grouped under the same group letter. To eliminate certain audio channels from the group letter that is cross-fading down, an ungroup audio object command is assigned. The control channel and all channels grouped to the control channel in audio object 110 is ungrouped from the cross-fade command.

In addition to the property page field(s), linking information can also be provided for an audio object 110. Any variable can be assigned one or more links to one or more audio objects 110. A link-to-audio object command assigns an audio control channel and any grouped audio channels to the selected audio object 110. As discussed above with reference to FIG. 1, audio object 110(*a*) is linked to audio object 110(*b*). As a result, audio object 110(*b*) is cross-faded down to bring down audio from VTR1 and bring up audio from MIC1.

For keyer control object 109, the property page field(s) includes a source for a background, key hole, and fill. In an embodiment, a link table is used to define the linking relationship between a key hole and fill. For CG object 112, the property page field(s) includes a source for a character generator or still store. Other field values are provided to specify control commands, such as read forward, read backward, read next buffer, and read previous buffer. CG presets can also be entered to read or buffer a specific page.

For camera object 113, the property page field(s) includes camera presets. Presets can be set for specific camera locations, including pan angle, tilt angle, zoom setting, iris setting, and/or focus setting. Control commands can be entered to implement dynamic auto track. A dynamic auto track view includes a zoom perspective, frame offset setting, sensitivity setting, and window setting. In an embodiment, a link table enables the director to link camera presets with audio and/or video channels.

For VTR object 114, the property page field(s) includes an identifier for the machine control device that is being automated. Other field values are provided to specify control commands, such as cue, play, stop, fast-forward, rewind, continuous play, shuffle, or the like. In an embodiment, a link table enables the director to link output from a machine control to a video channel. For GPO object 115, the property page field(s) includes a GPO Number that identifies a GPO or GPI device. In an embodiment, a link table enables the director to link output from a GPO port to a video channel. Teleprompter object 111 and encode object 116 also include property page field(s) for specifying control commands according to the present invention, including requisite sources and/or outputs. Linking information can also be specified to associate these objects and their variables with other automation control objects 101. For example, the teleprompter script for teleprompter object 111 can be linked with a channel used to synchronize video output from a camera. This allows the script to be used to support captioning in the downstream. In another example, a program output channel associated with a transition object 107 can be linked with an input channel to an encoding system controlled by encode object 116.

The aforementioned variable properties have been provided by way of example. The present invention is intended to include other properties associated with the control of media production device.

The present invention provides multiples techniques for entering linking information. As discussed above, linking information can be entered in a dialogue box containing property page field(s) or in a link table. Linking information can also be entered in variable property list 125. In another embodiment, linking information is entered by using an input device to drag-and-drop an automation control object 101 (i.e., the From Object) to another (i.e., the To Object). The From Object being dragged must have a variable assigned to at least one of the property page fields. If multiple variables are assigned to different property page fields, the director is prompted to select one of the variables for linking.

The device type assigned to the From Object and To Object determines the type of information that must be entered to complete the linking process. If two transition objects 107-108 are being linked, the director must specify an output field to complete the linking. For example, if DVE1 is being linked to DVE2, the director must specify that the output channel (e.g., program, preview, auxiliary) from DVE1 is to be linked to the output channel (e.g., program, preview, auxiliary) from DVE2. This can be accomplished by completing the command or variable property "Link DVE(#) Icon(#)–(Output Channel Field) to DVE(#) Icon(#)–(Output Channel Field)", which appears in variable name list 124.

If a transition object 107-108 is being linked to a keyer control object 109, the director must specify the output field for transition object 107-108 and the source field for keyer control object 109. For example, the program, preview, or auxiliary channel for DVE1 can be linked to background, key hole, or fill source from keyer control object 109. This can be accomplished by completing the command or variable property "Link DVE(#) Icon(#)–(Output Channel Field) to Key Icon(#)–(Source Field)", which appears in variable name list 124.

If a transition object 107-108 is being linked to audio object 110, the default link field is the audio control channel. The video-to-audio table associates a video channel with the audio channel(s). The linking commands or variable properties that must be specified depend on the audio command or audio grouping values. For instance, if the audio command is fade-up or fade-down, the program, preview, or auxiliary channel for a DVE can be linked to an audio channel. This can be accomplished by completing the command or variable property "Link DVE(#) Icon(#)–(Output Channel Field) to Audio Icon(#)", which appears in variable name list 124.

If the audio command is cross-fade, the program, preview, or auxiliary channel for a DVE can be linked to a subordinate channel or group of channels. This can be accomplished by completing the command or variable property "Link DVE(#) Icon(#)–(Output Channel Field) to Audio Icon(#) Cross-Fade (Cross-Fade Group)", which appears in variable name list 124. The field "Cross-Fade Group" identifies the master and subordinate channels.

If a transition object 107-108 is being linked to VTR object 114, the default link field is the control device. The video-to-port table associates a video channel to a machine control port. For example, the program, preview, or auxiliary channel for DVE1 can be linked to a video channel assigned to VTR object 114. This can be accomplished by completing the command or variable property "Link DVE(#) Icon(#)–(Output Channel Field) to Machine Icon(#)", which appears in variable name list 124.

If a transition object 107-108 is being linked to CG object 112, the default link field is the CG source. The video-to-port table associates a video channel to a CG control port. For example, the program, preview, or auxiliary channel for DVE1 can be linked to a channel assigned to CG object 112. This can be accomplished by completing the command or variable property "Link DVE(#) Icon(#)–(Output Channel Field) to CG Icon(#)", which appears in variable name list 124.

If a transition object 107-108 is being linked to GPO object 115, the default link field is the GPO number. The video-to-GPO table associates a video channel to a GPO port. For example, the program, preview, or auxiliary channel for DVE1 can be linked to a GPO port assigned to GPO object 115. This can be accomplished by completing the command or variable property "Link DVE(#) Icon(#)–(Output Channel Field) to GPO Icon(#)", which appears in variable name list 124.

If two audio objects 110 are being linked, the default link field is the audio control channel. An audio-to-audio table associates an audio channel or group of channels to another audio channel or group of channels. The director can also complete the command or variable property "Link Audio Icon(#) to Audio Icon(#)", which appears in variable name list 124.

The present invention includes other combinations of automation control objects 101. For example, VTR object 114 can be dragged and dropped onto audio object 110 to link video and audio inputs. Camera object 113 can be dragged and dropped onto audio object 110 to link video and audio inputs. VTR object 114 can be dragged and dropped onto CG object 112 to link a video input and CG control port. Two CG objects 112, two VTR objects 114, or two GPO objects can be linked. As stated, other combinations are intended to be within the scope of the present invention. When a link is created, a graphical representation is shown in link column 132, as discussed above with reference to FIG. 1.

Referring back to FIG. 3, after the build information is entered for all variables, control passes to step 312. At step 312, the director saves the populated control lines 118(*a*)-118(*n*) and build information to a macro element template file. The director also selects location or directory for saving the macro element template file. Afterwards, the control flow ends as indicated at step 395.

After a macro element template has been created, the template can be opened in a replicator control interface, which replicates the various ranges set for each variable. The replicator control interface is associated with executable instructions for building various combinations of macro elements from the ranges of sources specified in a macro element template.

Figure 6:
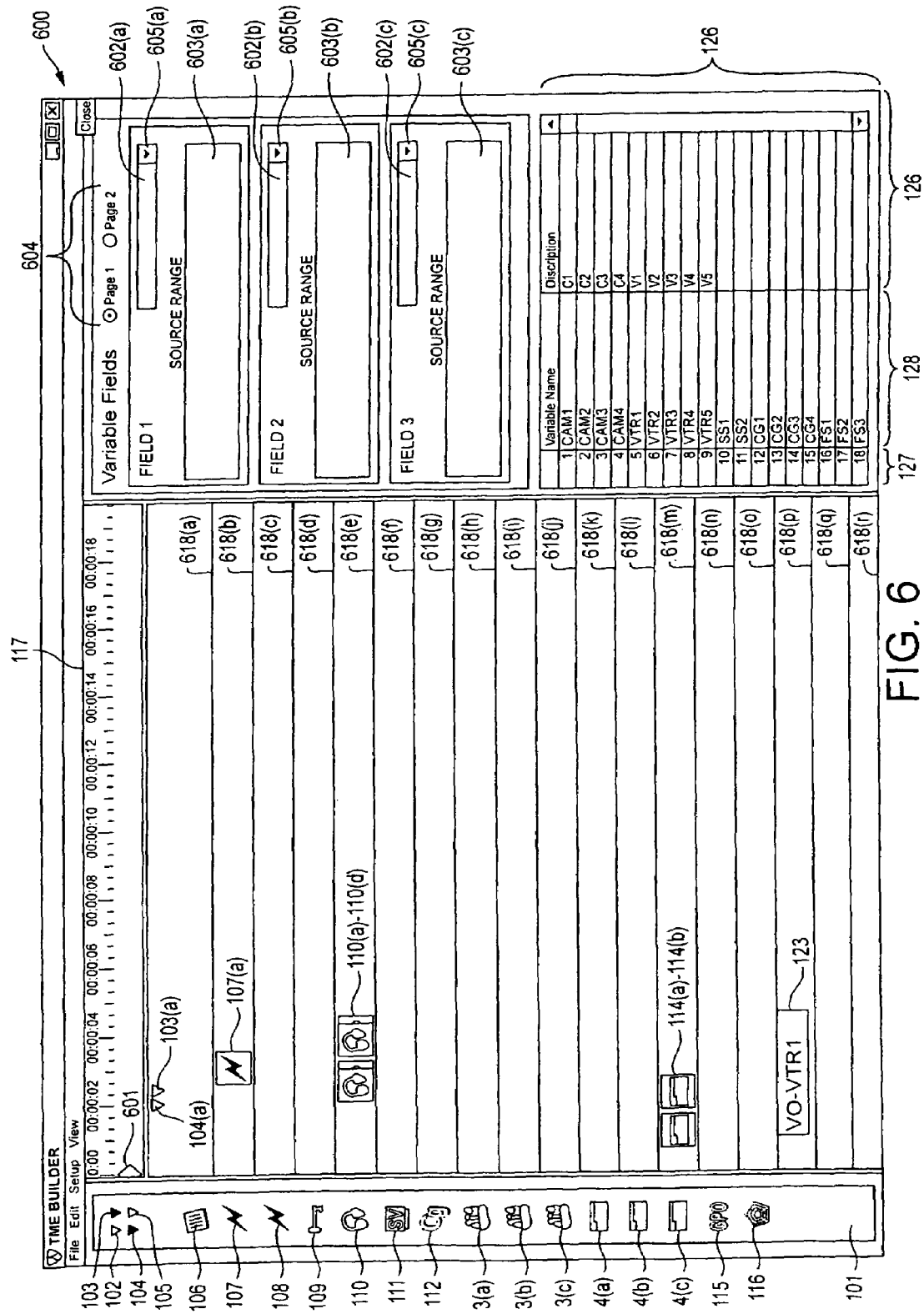
FIG. 6 illustrates a replicator control interface for building a collection of macro elements according to an embodiment of the present invention.

FIG. 6 illustrates a replicator control interface 600 for building a collection of macro elements according to an embodiment of the present invention. Control lines 618(*a*)-618(*r*) are populated from top to bottom by reading the variables and the variable properties from the macro element template file created for VO-VTR1 label 123, described with reference to FIG. 1. As shown in FIG. 2, step mark 104(*a*) and GPO mark 103(*a*) are placed on control line 618(*a*). Transition object 107(*a*) is placed on transition control line 618(*b*). Audio objects 110(*a*)-110(*d*) are placed on audio control line 618(*e*). VTR objects 114(*a*)-114(*b*) are placed on VTR control line 618(*k*).

Control lines 618(*a*)-618(*r*) are similar to control lines 118(*a*)-118(*n*) described above. However, each control line 618(*a*)-618(*r*) is assigned to a specific device type, as determined by the automation control objects 101 positioned to the left of the control lines 618(a)-618(r). Thus, in an embodiment, control lines 618(a)-618(r) are fixed to a specified automation control object 101. In another embodiment, control lines 618(a)-618(r) are flexible, and similar to control lines 118(a)-118(n), can have their device types altered by the automation control object 101 positioned on the control line 618(a)-618(r).

Similar to control interface 100, replicator control interface 600 includes video naming table 126. However, replicator control interface 600 replaces variable name list 124 and variable property list 125 with a variable replication fields 602(a)-602(c) and source lists 603(a)-603(c). Page toggle 604 allows access to additional variable replication fields (not shown).

Timeline 117 includes a timer indicator 601. A timer (not shown) is integrated into timeline 117, and operable to activate a specific automation control object 101 as a timer indicator 601 travels across timeline 117 to reach a location linked to the specific automation control object 101. Timeline 117 is demarcated in seconds. However, in another embodiment, the spatial coordinates of timeline 117 are demarcated in frames or some other unit of measurement.

Figure 7:
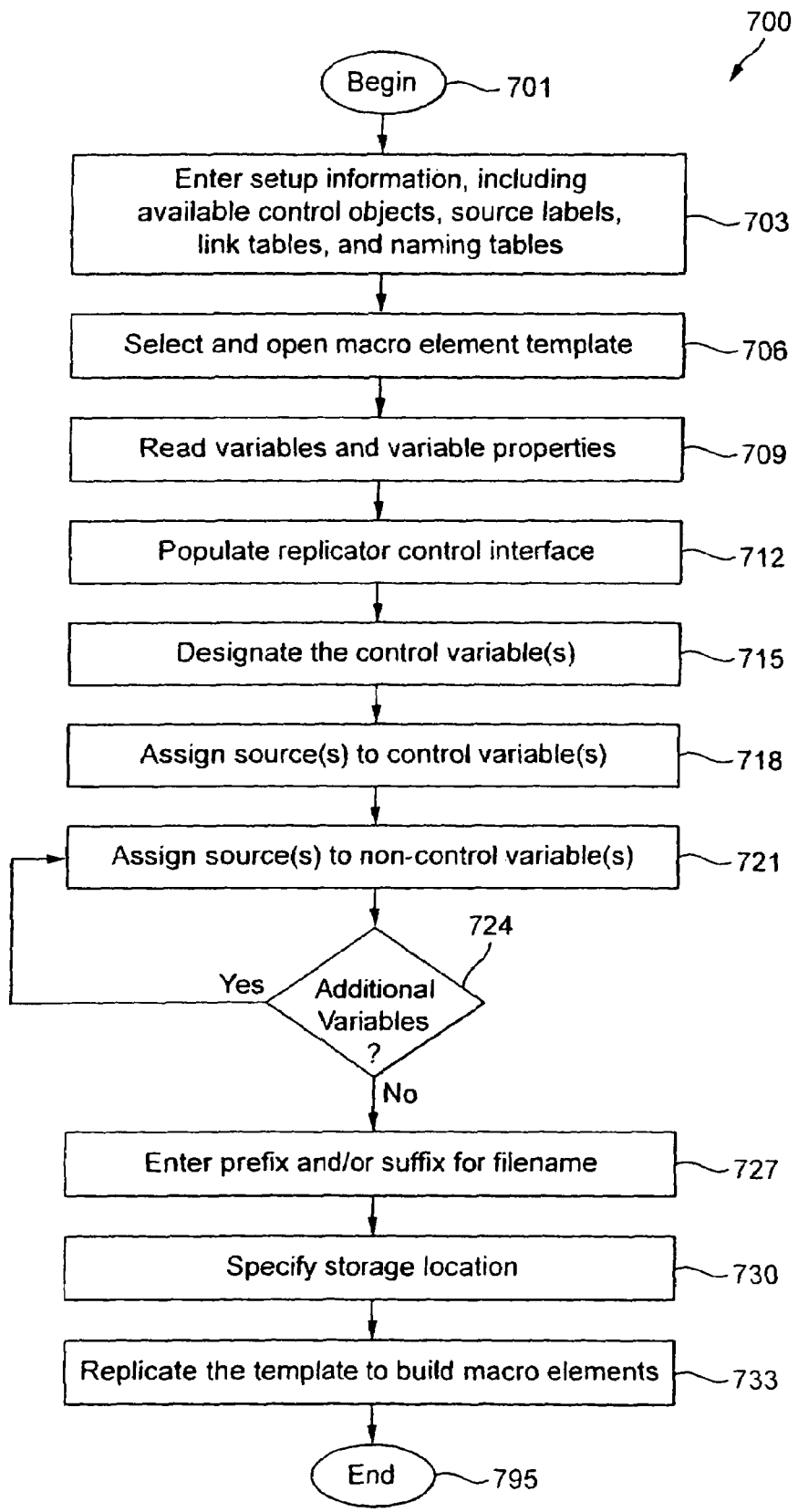
FIG. 7 illustrates an operational flow for replicating a macro element template to build and name a collection of macro elements according to an embodiment of the present invention.

After importing the macro element template, the director can edit the template as desired. Once the template has been approved, the director initiates the replication process by using an input device to activate a replication button (not shown), select a replication command from a drop-down menu (not shown), or the like. Thereafter, the sources assigned to the automation control object 101 are ranged to perform the replication. The replication process is described with reference to flowchart 700 in FIG. 7. Referring to FIG. 7, flowchart 700 shows an example of a control flow for replicating a macro element template to build a library of macro elements according to an embodiment of the present invention.

The control flow of flowchart 700 begins at step 701 and passes immediately to step 703. At step 703, a set-up file is opened to access the configuration parameters. As discussed with reference to FIG. 3, the set-up file includes a list of automation control objects 101 that are available for a specified studio system. Referring back to FIG. 6, the automation control objects 101 are displayed on replicator control interface 600, and indicate the types of media production devices that are available for the specified system.

The configuration parameters include a listing of source labels used to designate I/O ports to the media production devices. Also provided are the link tables for specifying the operational rules for associating various sources, and the naming tables for providing user-defined or default source labels for the media production devices.

At step 706, a macro element template file is selected and opened. The timeline positions and properties of each automation control object 101 must be locked when the file is opened.

At step 709, the variables and variable properties are read from the macro element template file. This information includes information from variable name list 124 and variable property list 125, described above.

At step 712, the variables and variable properties are used to populate the control lines of the replicator control interface. As shown in FIG. 6, control lines 618(a)-618(r) display the automation control objects 101 and variable properties from the macro element template of FIG. 1. Control lines 618(a)-618(r) are populated from top to bottom based on the order of appearance in variable replication fields 602(a)-602(c). If drop-down arrows 605(a)-605(c) are activated for variable replication fields 602(a)-602(c), a dropdown list of variable names are displayed for the automation control objects 101, which are displayed on control lines 618(a)-618(r). Initially, all three variable replication fields 602(a)-602(n) display an identical list of variable names. The contents of variable replication fields 602(a)-602(n) change as information is selected from the contents, as discussed below.

At step 715, the director selects a control variable, which is used to range the other variables. The control variable remains fixed until the matrix of other variables being ranged is completed. The control variable is selected from one of the variable names listed in variable replication field 602(a). The control variable is typically the first variable that appears in variable replication field 602(a); however, other variables can be selected. For example, if the variables correspond to audio object 110, the audio control variable field is typically selected to be the control variable. Once the control variable has been selected from variable replication field 602(a), the control variable is removed from the list displayed in variable replication fields 602(b)-602(c).

At step 718, input sources or a range of input sources are selected for the control variable. Each variable (i.e., the automation control object 101 corresponding to the variable) is assigned a device type (e.g., video, audio, machine, etc.), as discussed above. When the control variable is selected (at step 715), a list of available sources matching the assigned device type appears in source range 603(a). The source table that corresponds to the automation control object 101 for the control variable opens in source range 603(a). For example, if a transition object 107 is assigned to a DVE variable, a list of video inputs is displayed in source range 603(a). As such, a video input or a range of video inputs would be selected for the DVE variable.

Therefore, a single source or multiple sources can be selected and assigned to a variable. If multiple sources are selected, the sources can be sequential or non-sequential. For example, assume that the available video inputs for a DVE variable are input 1, input 2, input 3, input 4, input 5, and input 6. As such, the DVE variable could be assigned to a single source (such as, input 1), multiple sequential sources (such as, input 2, input 3, and input 4), or multiple non-sequential sources (such as, input 5, input 1, and input 6).

After the control variable is selected and assigned one or more sources, the non-control variables are selected and assigned one or more sources at step 721. If no source is selected for a non-control variable, the variable is left stagnant during replication, discussed below. Therefore, at step 724, the control flow determines if additional variables are available to be sourced. If so, control returns to step 721, and the process is repeated.

Hence, once a variable name is selected from variable replication field 602(b), the selected variable name is removed from variable replication field 602(c). Although only three variable replication fields 602(a)-602(c) are displayed on replicator control interface 600, more fields can be added as required. Page toggle 604 allows access to additional variable replication fields.

After sources have been assigned to all variables that will be ranged during replication, control passes to step 727. At step 727, the director enters a prefix, suffix, or both. This information will be included as part of the filename and association name of each macro element that is built during replication. At step 730, a storage location or directory is specified for the macro elements built during replication.

At step 733, replication is initiated to build a collection of macro elements from the macro element template. The collection of macro elements contains all eligible combinations of sources for all variables. When sources are selected at step

718 for the variables, it is possible that the selected sources overlap for two or more variable. If this occurs, a macro element is not built or saved for a combination having multiple variables with the same source. The combination is skipped, and the replication process continues to build macro elements.

During replication, each macro element is built in the specified storage location, and an association file is created or updated with the new macro element and path information. A macro element file list is also created or updated with a filename for each built macro element. In an embodiment, the macro element file list includes a printable listing of the filenames and variable properties (e.g., linking information, device type, etc.) for each macro element file. The macro element file list, therefore, provides a library of macro elements for a director to select. If a label object (e.g., label object 123) is present, the macro element filename is inserted into the label object.

In an embodiment, a universal naming convention provides a standard format for creating a filename, association name, and path to each macro element file built during replication. In an embodiment, the syntax "//server/share/path/filename" is used for the path. The filename is based on the template filename and the variable names from the naming tables. The naming order of the variable names is determined by the order in which the variables are placed in variable replication fields 602(*a*)-602(*c*). Since the user or director is able to choose the variable names in the naming tables, as described above, the present invention allows a library of macro elements to be created and labeled with user-defined filenames. Therefore, the director can easily select a preferred macro element using site-specific or local terminology and without having to learn a nonuser-friendly nomenclature.

For example, assume that "VO" is the template name for a macro element template that has been created for a voice over segment. Further assume that the macro element template includes two variables in variable replication fields 602(*a*)-602(*c*). The first variable is linked to a machine naming table, and has two sources VTR1 and VTR2. The second variable is linked to an audio naming table and has two sources MIC1 and MIC2. If the variable name "VTR" is placed in the first variable replication field 602(*a*), and the variable name "MIC" is placed in the second variable replication field 602(*b*), the macro element filenames would be "VO-VTR1-MIC1," "VO-VTR1-MIC2," "VO-VTR2-MIC1," and "VO-VTR2-MIC2" for four macro element files built during replication. The association file, association names, and macro element file lists are updated with the filenames and path information. Association names are used to integrate an automation control system (such as, the above-discussed Transition Macro™ multimedia production control program) with news automation systems and a director's rundown sheet, as described in the pending U.S. application entitled "Method, System and Computer Program Product for Full News Integration and Automation in a Real Time Video Production Environment" (U.S. application Ser. No. 09/822, 855), which is incorporated herein by reference in its entirety.

Figure 8A:
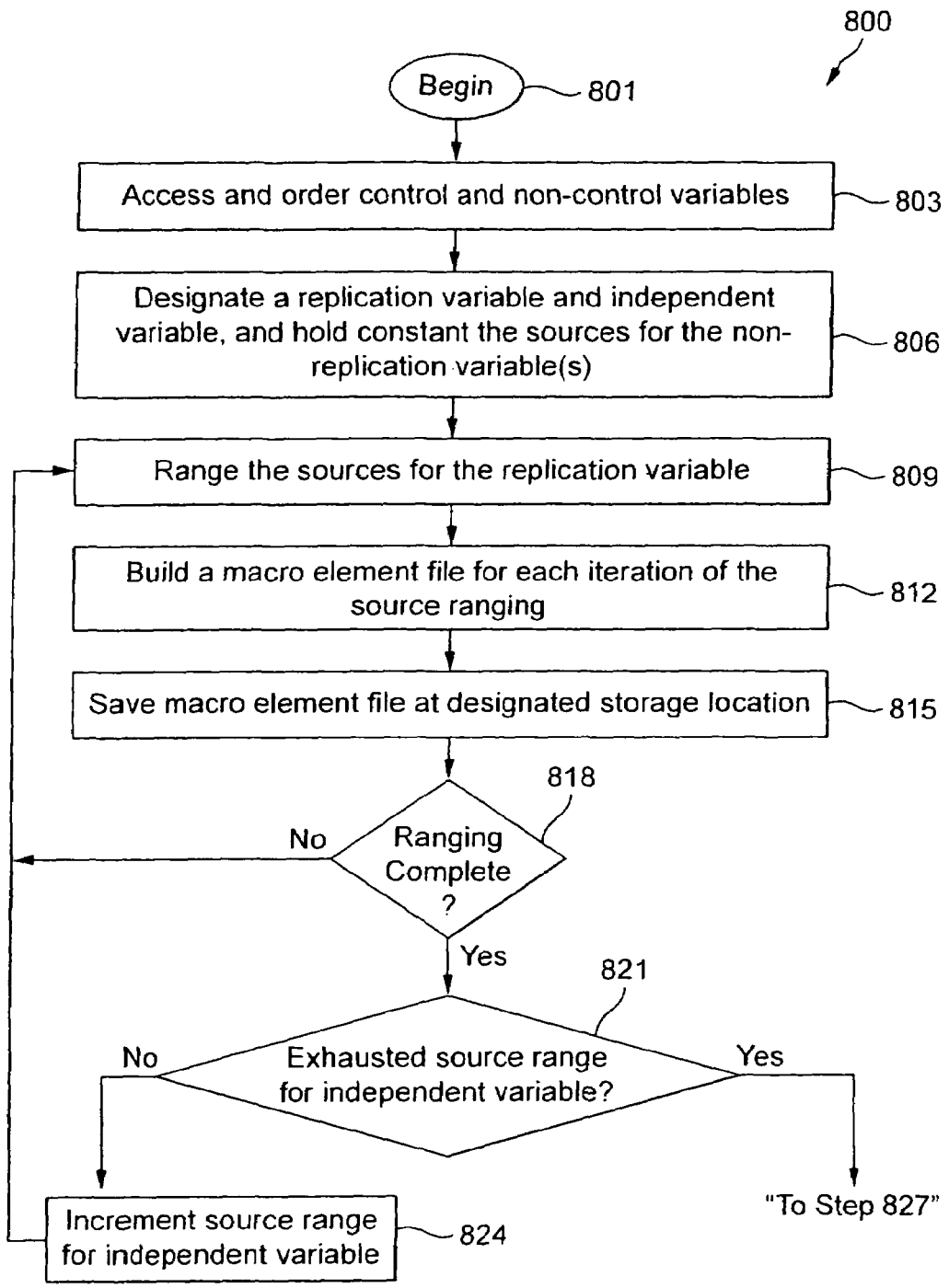
FIGS. 8a-8b illustrate an operation flow for replicating a macro element template to build a collection of macro elements according to an embodiment of the present invention.
Figure 8B:
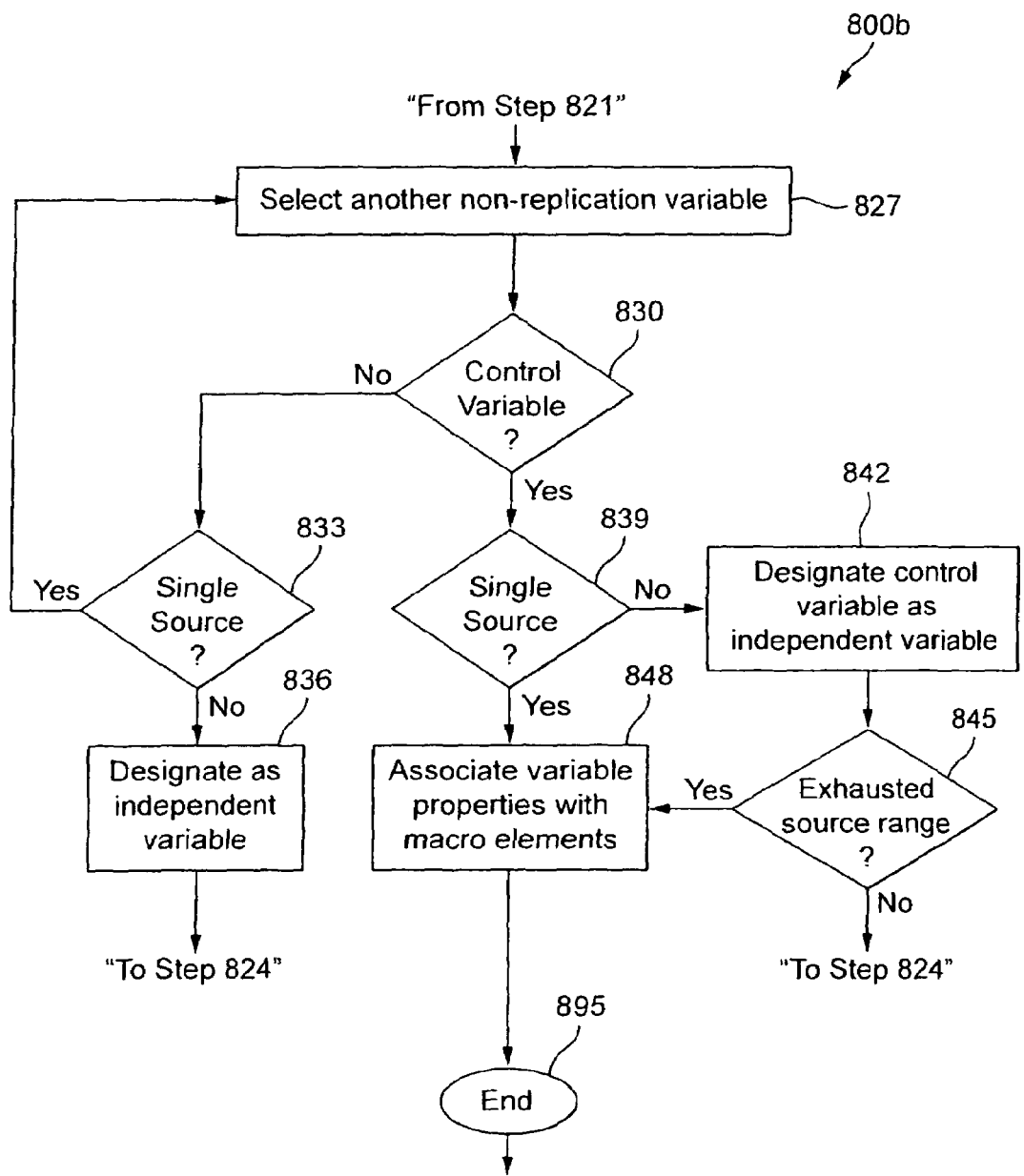

After the macro element files are built and saved, the control flow ends as indicated at step 795. The replication process, itself, can be explained with reference to FIGS. 8*a*-8*b*. Referring to FIGS. 8*a*-8*b*, flowchart 800 (shown as 800*a*-800*b*) describes an example of a control flow for replicating a macro element template to build a collection of macro elements according to an embodiment of the present invention. Specifically, flowchart 800 describes an embodiment of the replication process described at step 733 above.

The control flow of flowchart 800 begins at step 801 and passes immediately to step 803. At step 803, the control and non-control variables are accessed and ordered from top to bottom, with the control variable at the top of the order.

At step 806, the source ranges for all of the variables are fixed or locked, except for the bottom-most variable. If multiple sources have been assigned (at step 718) to the fixed variable, the first source is selected and held constant during replication. If a single source is assigned, the individual source is held constant.

As for the bottom-most variable, this variable is designated the replication variable. The next variable above the replication variable in the ordered list is designated as the independent variable.

At step 809, the sources for the replication variable are ranged. If a single source has been assigned (at step 718), this source is selected. If multiple sources are assigned, each source is selected one by one.

At step 812, the selected sources for the replication variable and the fixed variables are used to build a macro element file. At step 815, the macro element file saved to a designated storage location with a filename, as discussed above.

At step 818, the replication variable is inspected to determine if additional sources are available for ranging. If so, control passes to step 809 and the next source is selected. After the range of sources has been exhausted for the replication variable, control passes to step 821.

At step 821, the independent variable is inspected to determine if its range of sources has been exhausted. If the independent variable is assigned a single source, control passes to step 827. If the independent variable is assigned to multiple sources, control passes to step 824 for the first iteration. However, for future iterations, control passes to step 824 only if one of the assigned sources has not been used during the replication.

At step 824, the independent variable is incremented once to select the next source in its range. Afterwards, control passes to step 809 and the replication variable is ranged for the new source for the independent variable.

At step 827, the next variable above the replication variable is selected. At step 830, the selected variable is inspected. If the selected variable is the control variable, control passes to 839. Otherwise, at step 833, the selected variable is inspected for acceptability. If the selected variable has a single source, the variable is skipped. Control returns to step 827 and the next highest variable is selected. Then, the variable is inspected at step 830.

If, however, the selected variable is found to have multiple sources at step 833, this variable is designated as the independent variable at step 836. Afterwards, control returns to step 824.

At step 839, the control variable is inspected for acceptability. If the control variable is assigned to a single source, control passes to step 848.

If the control variable has multiple sources, at step 842, the control variable is designated as the independent variable. At step 845, the independent variable is inspected to determine if its range of sources has been exhausted. Control returns to step 824 for the first iteration. However, for future iterations, control passes to step 824 only if one of the assigned sources has not been used during the replication. If all sources have been exhausted, control passes to step 848.

Therefore, each time the replication variable completes its range, the next variable above is incremented until the range of sources for the next variable has been exhausted. This process continues until the control variable is selected at step 830, and the entire range of sources for the control variable has been exhausted at step 845.

At step 848, the variable properties are associated with each built macro element. Starting with the control variable, the naming tables, linking information, and other build information are included with the macro element file. As discussed above, the naming tables support the naming convention for automatically creating macro element filenames. The linking information allows the variables to be linked, such that future changes made to a particular source is automatically reflected in all macro elements containing the changed source. Once the replication process is completed, the control flow ends as indicated at step 895.

Thus, the present invention enables a library of macro element files to be built from a macro element template. The build information that is associated with a macro element elevates the level of intelligence for an automated multimedia production system. The link tables, for example, permit the related fields for each macro element to be tracked and monitored. The link tables integrate the macro elements with each other, such that a change in the production values or property fields of one macro element will automatically ripple throughout the macro element library to automatically update the related production values or property fields of other macro elements. Therefore, the director does not have to keep track of the individual properties of each macro element file to ensure that the production values are updated when a change is made during a production.

For example, if a machine failure occurs with respect to VTR1, the director can edit the build information to replace VTR1 with another RPD, such as VTR2. The macro elements would be dynamically changed to update all macro elements for VTR1 to assign VTR2 in place of VTR1. In addition to making global changes to the production values, an embodiment of the present invention allows a director to perform global searches to identify macro elements having specified values within a particular field.

Once a macro element has been built according to the present invention, the macro element can be tested to ensure that the macro element operates properly with each source. In an embodiment, the macro elements built from replication are tested with an automation control program, such as the above-discussed Transition Macro™ multimedia production control program. The automation control program executes each macro element file to test the sources and/or produce a media production.

In an embodiment, a standalone application is provided to build macro elements from a macro element template. Afterwards, the macro elements are imported into a separate automation control program.

In another embodiment, a macro element is built on an automation control program and subsequently imported into control interface 100, which builds a macro element template. A collection of macro elements are built from the macro element templates, and then, each macro element is imported into an automation control program for testing and automation control.

In another embodiment, the present invention (e.g., control interface 100 and replication control interface 600) are integrated into an automaton control program to allow the creation of macro element templates, which are replicated to produce a collection of macro elements for each template. Each macro element can be tested and executed to produce a media production without having to import the macro element into another application program.

FIGS. 1-8 are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

Figure 9:
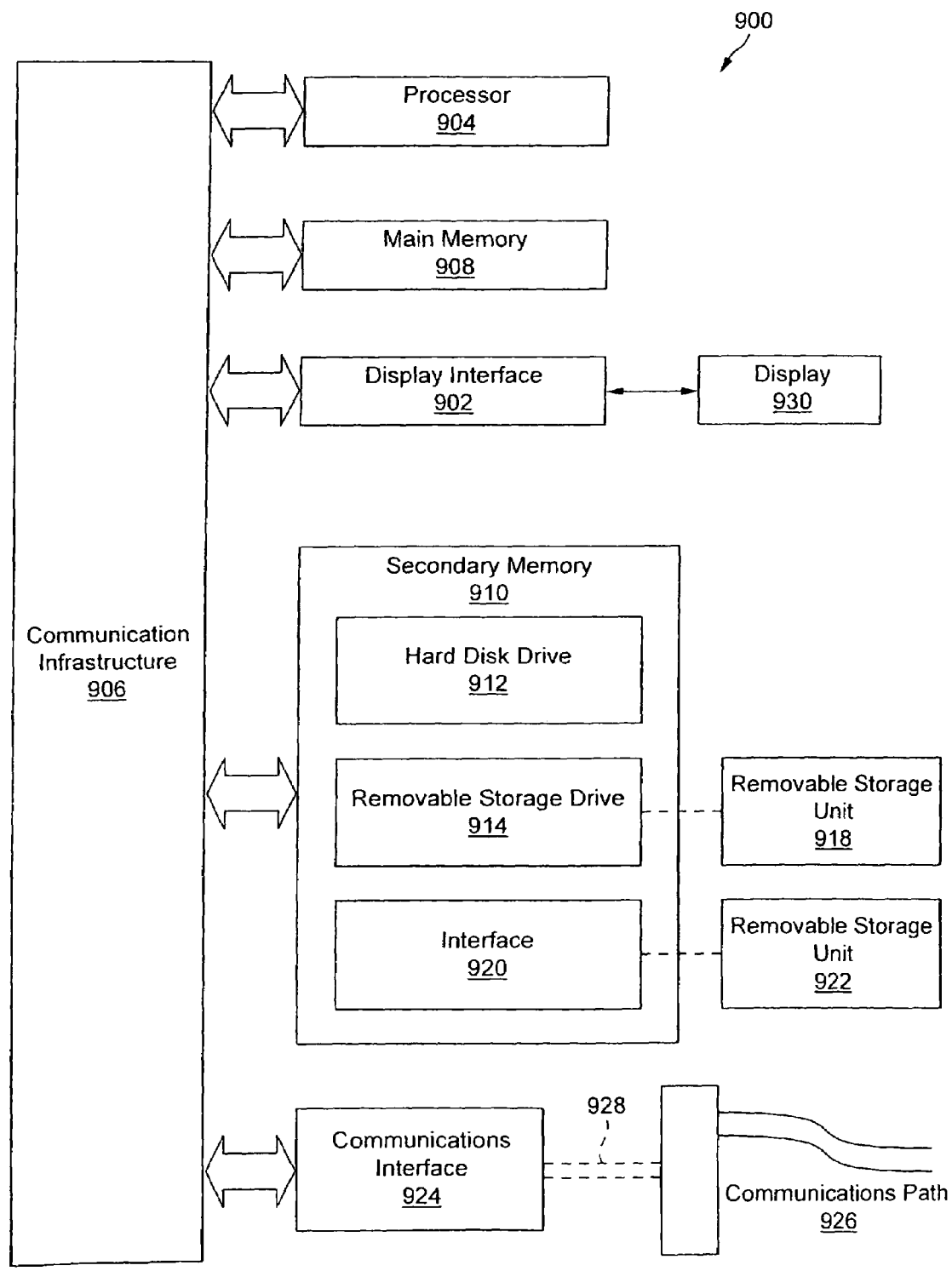
FIG. 9 illustrates an example computer system useful for implementing portions of the present invention.

The present invention can be implemented in one or more computer systems capable of carrying out the functionality described herein. Referring to FIG. 9, an example computer system 900 useful in implementing the present invention is shown. Various embodiments of the invention are described in terms of this example computer system 900. After reading this description, it will become apparent to one skilled in the relevant art(s) how to implement the invention using other computer systems and/or computer architectures.

The computer system 900 includes one or more processors, such as processor 904. The processor 904 is connected to a communication infrastructure 906 (e.g., a communications bus, crossover bar, or network). Various software embodiments are described in terms of this exemplary computer system. After reading this description, it will become apparent to one skilled in the relevant art(s) how to implement the invention using other computer systems and/or computer architectures.

Computer system 900 can include a display interface 902 that forwards graphics, text, and other data from the communication infrastructure 906 (or from a frame buffer not shown) for display on the display unit 930.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc. which is read by and written to removable storage drive 914. As will be appreciated, the removable storage unit 918 includes a computer usable storage medium having stored therein computer software (e.g., programs or other instructions) and/or data.

In alternative embodiments, secondary memory 910 can include other similar means for allowing computer software and/or data to be loaded into computer system 900. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 can also include a communications interface 924. Communications interface 924 allows software and data to be transferred between computer system 900 and external devices. Examples of communications interface 924 can include a modem, a network interface (such as an Ethernet card), a communications port, a PCMCIA slot and card, etc. Software and data transferred via communications interface 924 are in the form of signals 928 which can be electronic, electromagnetic, optical, or other signals capable of being received by communications interface 924. These signals 928 are provided to communications interface 924 via a communications path (i.e., channel) 926. Communications path 926 carries signals 928 and can be implemented using wire or cable, fiber optics, a phone line, a cellular phone link, an RF link, and other communications channels.

In this document, the terms "computer program medium" and "computer usable medium" are used to generally refer to media such as removable storage unit 918, removable storage unit 922, a hard disk installed in hard disk drive 912, and signals 928. These computer program products are means for providing software to computer system 900. The invention is directed to such computer program products.

Computer programs (also called computer control logic or computer readable program code) are stored in main memory 908 and/or secondary memory 910. Computer programs can also be received via communications interface 924. Such computer programs, when executed, enable the computer system 900 to implement the present invention as discussed herein. In particular, the computer programs, when executed, enable the processor 904 to implement the processes of the present invention, such as the method(s) implemented using various components of control interface 100 and replication control interface 600 described above, such as various steps of methods 200, 300, 700, and 800, for example. Accordingly, such computer programs represent controllers of the computer system 900.

In an embodiment where the invention is implemented using software, the software can be stored in a computer program product and loaded into computer system 900 using removable storage drive 914, hard drive 912, interface 920, or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

The foregoing description of the specific embodiments will so fully reveal the general nature of the invention that others can, by applying knowledge within the skill of the art (including the contents of the documents cited and incorporated by reference herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the art.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method of managing a collection of macro element files for producing one or more media productions, comprising the steps of: (1) importing a macro element file from said collection, each macro element in said file enabling serial and parallel processing of media production commands to achieve automated control of media production devices to produce a segment of a media production; (2) placing one or more control objects associated with said macro element on a display relative to a time line in sequence order; (3) activating a first control object from the placed one or more control objects to access the property parameters for said first control object; (4) modifying said property parameters to specify build information for producing an element of a media production; and (5) creating a macro element template file comprising said first control object and the modified property parameters.

2. A method of managing a collection of macro element template files for producing one or more media productions, comprising the steps of: (1) placing one or more control objects onto a display relative to a time line in sequence order; (2) activating said one or more control objects to access property parameters for said one or more control objects; (3) modifying said property parameters to specify build information for producing an element of a media production; and (4) creating a macro element template file comprising said one or more control objects and the modified property parameters, each macro element in said file enabling serial and parallel processing of media production commands to achieve automated control of media production devices to produce a segment of a media production.

3. The method according to claim 2, wherein step (3) further comprises the step of: (5) modifying said property parameters to specify a device type for a set of one or more production devices.

4. The method according to claim 3, further comprising the step of: (6) displaying said one or more control objects on a separate control line configurable to enable interactions with a production device matching the specified device type for the displayed control object.

* * * * *